United States Patent
Dong et al.

(10) Patent No.: US 10,397,616 B2
(45) Date of Patent: Aug. 27, 2019

(54) CROSS-PLANE FILTERING FOR CHROMA SIGNAL ENHANCEMENT IN VIDEO CODING

(71) Applicant: VID SCALE, INC., Wilmington, DE (US)

(72) Inventors: Jie Dong, San Diego, CA (US); Yuwen He, San Diego, CA (US); Yan Ye, San Diego, CA (US)

(73) Assignee: VID SCALE, Inc., Wilmington, DE (US)

( * ) Notice: Subject to any disclaimer, the term of this patent is extended or adjusted under 35 U.S.C. 154(b) by 1396 days.

(21) Appl. No.: 14/039,429

(22) Filed: Sep. 27, 2013

(65) Prior Publication Data

US 2014/0092999 A1    Apr. 3, 2014

Related U.S. Application Data

(60) Provisional application No. 61/707,682, filed on Sep. 28, 2012, provisional application No. 61/762,611, (Continued)

(51) Int. Cl.
  *H04N 19/70* (2014.01)
  *H04N 19/86* (2014.01)
  (Continued)

(52) U.S. Cl.
  CPC ............. *H04N 19/86* (2014.11); *H04N 19/70* (2014.11); *H04N 19/117* (2014.11); *H04N 19/186* (2014.11); *H04N 19/30* (2014.11)

(58) Field of Classification Search
  CPC .. H04N 19/186; H04N 19/117; H04N 19/176; H04N 19/136; H04N 19/172
  See application file for complete search history.

(56) References Cited

U.S. PATENT DOCUMENTS 4,701,783 A * 10/1987 Glenn ................... H04N 5/772
                                                                       375/240.25
7,720,156 B2    5/2010 Kim et al.
(Continued)

FOREIGN PATENT DOCUMENTS

EP          1509045 A2    2/2005
KR   10-2010-0038164 A    4/2010
(Continued)

OTHER PUBLICATIONS

Bross et al., "High efficiency video coding (HEVC) text specification draft 8", JCTVC-J1003, 10th Meeting: Stockholm, SE, Jul. 11-20, 2012, 294 pages.
(Continued)

*Primary Examiner* — Obafemi O Sosanya
(74) *Attorney, Agent, or Firm* — Condo Roccia Koptiw LLP

(57) ABSTRACT

Cross-plane filtering may be used to restore blurred edges and/or textures in one or both chroma planes using information from a corresponding luma plane. Adaptive cross-plane filters may be implemented. Cross-plane filter coefficients may be quantized and/or signaled such that overhead in a bitstream minimizes performance degradation. Cross-plane filtering may be applied to select regions of a video image (e.g., to edge areas). Cross-plane filters may be implemented in single-layer video coding systems and/or multi-layer video coding systems.

12 Claims, 25 Drawing Sheets

Related U.S. Application Data filed on Feb. 8, 2013, provisional application No. 61/778,218, filed on Mar. 12, 2013, provisional application No. 61/845,792, filed on Jul. 12, 2013.

(51) Int. Cl.
　　*H04N 19/30* 　　(2014.01)
　　*H04N 19/117* 　(2014.01)
　　*H04N 19/186* 　(2014.01)

(56) References Cited

U.S. PATENT DOCUMENTS

| | | | |
|---|---|---|---|
| 7,778,459 | B2 | 8/2010 | Song |
| 8,467,459 | B2 | 6/2013 | Yin et al. |
| 9,503,733 | B2* | 11/2016 | Minoo .................. H04N 19/117 |
| 2005/0168650 | A1* | 8/2005 | Walls ..................... H04N 9/646 348/666 |
| 2007/0109448 | A1 | 5/2007 | Winger et al. |
| 2008/0043840 | A1 | 2/2008 | Song |
| 2009/0129465 | A1 | 5/2009 | Lai et al. |
| 2010/0086026 | A1 | 4/2010 | Paniconi et al. |
| 2011/0150080 | A1 | 6/2011 | Watanabe et al. |
| 2012/0008687 | A1 | 1/2012 | Haskell |
| 2014/0086316 | A1* | 3/2014 | Kerofsky ............... H04N 19/70 375/240.12 |
| 2014/0092999 | A1 | 4/2014 | Dong et al. |
| 2014/0185680 | A1 | 7/2014 | Li et al. |
| 2014/0334559 | A1 | 11/2014 | Kim et al. |
| 2014/0369426 | A1* | 12/2014 | Li .......................... H04N 19/46 375/240.29 |
| 2015/0015783 | A1 | 1/2015 | Bernard et al. |
| 2015/0036744 | A1 | 2/2015 | Sato |
| 2015/0195566 | A1 | 7/2015 | Hinz et al. |

FOREIGN PATENT DOCUMENTS

| | | |
|---|---|---|
| WO | WO 2006/108654 A2 | 10/2006 |
| WO | WO 2008/020687 A1 | 2/2008 |
| WO | WO 2010/001999 A1 | 1/2010 |
| WO | WO 2013/164922 A1 | 11/2013 |
| WO | WO 2016/172314 A1 | 10/2016 |

OTHER PUBLICATIONS

ISO/IEC, "Joint Call for Proposals on Scalable Video Coding Extensions of High Efficiency Video Coding (HEVC)", ISO/IEC JTC 1/SC 29/WG 11 and ITU-T SG 16 WP 3, ISO/IEC JTC1/SC29/WG11 N12957, Stockholm, Sweden, Jul. 2012, 11 pages.

ITU-R, "Studio Encoding Parameters of Digital Television for Standard 4:3 and Wide-Screen 16:9 Aspect Ratios", Recommendation ITU-R BT.601-5, Section 11 B: Digital Television, 1998, pp. 1-16.

ITU-T, "Advanced Video Coding for Generic Audiovisual Services", ITU-T Recommendation H.264, Nov. 2007, 563 pages.

JM reference software JM16.1, Document Available at: http://iphome.hhi.de/suehring/tml/download/jm16.1.zip, Sep. 2009.

Luthra, "Requirements of the Scalable Enhancement of HEVC", WG11 Requirements and Video, N12956, Stockholm, Sweden, Jul. 2012, 12 pages.

Luthra, Ajay, "Use Cases for the Scalable Enhancement of HEVC", ISO/IEC JTC-1/SC29/WG11 M24483, Apr. 2012.

SMPTE, "VC-1 Compressed Video Bitstream Format and Decoding Process-Amendment 2", Amendment 2:2011 to SMPTE ST 421 M:2006, Apr. 2006, pp. 1-5.

Sullivan et al., "Rate-Distortion Optimization for Video Compression", Signal Processing Magazine, IEEE, vol. 15, No. 6, Nov. 1998, pp. 74-90.

Cho et al, "Color Transient Improvement with Transient Detection and Variable Length Nonlinear Filtering", IEEE Transactions on Consumer Electronics, vol. 54, No. 4, Nov. 2008, pp. 1873-1879.

Dong et al., "Chroma Enhancement for ILR Picture", InterDigital Communications, LLC, JCTVC-L0059, Joint Collaborative Team on Video Coding (JCT-VC) of ITU-T SG 16 WP 3 and ISO/IEC JTC 1/SC 29/WG 11, 12th Meeting: Geneva, CH, Jan. 14-23, 2013, pp. 1-6.

Dong et al., "Cross-Plane Chroma Enhancement for SHVC Inter-Layer Prediction", IEEE, 2013 Picture Coding Symposium (PCS), Dec. 2013, pp. 309-312.

Kim et al., "New Intra Chroma Prediction Using Inter-Channel Correlation", JCTVC-B021, Joint Collaborative Team on Video Coding (JCT-VC) of ITU-T SG16 WP3 and ISO/IEC JTC/SC29/WG11, 2nd Meeting, Geneva, CH, Jul. 21-28, 2010, 9 pages.

Lee et al., "Intra Prediction Method Based on the Linear Relationship Between the Channels for YUV 4:2:0 Intra Coding", 16th IEEE International Conference on Image Processing (ICIP), Nov. 7-10, 2009, 4 pages.

Li et al., "Non-SCE3: Region Based Inter-Layer Cross-Color Filtering", Qualcomm Incorporated, Samsung Electronics, Ltd., JCTVC-N0229, Joint Collaborative Team on Video Coding (JCT-VC) of ITU-T SG 16 WP 3 and ISO/IEC JTC 1/SC 29/WG 11, 14th Meeting: Vienna, AT, Jul. 25-Aug. 2, 2013, pp. 1-12.

Bordes et al., "AHG14: Color Gamut Scalable Video Coding using 3D LUT", Technicolor, JCTVC-M0197, 13th Meeting: Incheon, KR, Apr. 18-26, 2013, 10 pages.

Boyce et al., "Draft High Efficiency Video Coding (HEVC) Version 2, Combined Format Range Extensions (RExt), Scalability (SHVC), and Multi-View (MV-HEVC) Extensions", JCTVC-R1013, Jun. 30-Jul. 9, 2014, 382 pages.

Dong et al., "Cross-Plane Chroma Enhancement for SHVC Inter-Layer Prediction", IEEE, 2013 Picture Coding Symposium (PCS), Dec. 2013, 4 pages.

Ebrahimi et al., "Description of Subjective Evaluation for Evidence (CfE) for HDR and WCG Video Coding", M35481, Geneva, Switzerland, Feb. 2015, 3 pages.

EXR, "OpenEXR", Available at hitp://www.openexr.com/, retrieved on Oct. 9, 2017, 9 pages.

Ferwerda, J. A., "Elements of Early Vision for Computer Graphics", IEEE Computer Graphics and Applications, vol. 21, No. 5, Sep./Oct. 2001, pp. 22-33.

Fogg et al., "Output Code Map SEI", Motion Picture Laboratories Inc., JCTVC-T0102, 20th Meeting: Geneva, CH, Feb. 10-18, 2015, 4 pages.

François et al., "Interim Report on the Anchors Generation in View of the CFE for HDR/WCG Video Coding", M35467, Geneva, Switzerland, Feb. 2015, 6 pages.

Goris et al., "Parameter Based Compatible HDR Proposal", M35067, Strasbourg, France, Oct. 2014, 4 pages.

ISO/IEC, "Information technology—Coding of Audio-Visual Objects—Part 2: Visual", Reference number: ISO/IEC 14496-2:2001(E), Dec. 1, 2001, 536 pages.

ISO/IEC, "Information Technology—Coding of Moving Pictures and Associated Audio for Digital Storage Media at up to about 1,5 Mbit/s—Part 2: Video", Ref. No. ISO/IEC 11172-2:1993/Cor. 3:2003(E), Nov. 1, 2003, 6 pages.

ITU, "Codec for Audiovisual Services At n × 384 kbit/s", Reedition of CCITT Recommendation H.261 published in the Blue Book, Fascicle III.6, Nov. 1988, 14 pages.

ITU-R, "Parameter Values for the HDTV Standards for Production and International Programme Exchange", Recommendation ITU-R BT.709-6, Jun. 2015, 19 pages.

ITU-R, "Parameter Values for UHDTV Systems for Production and International Programme Exchange", ITU-R Recommendation BT.2020, Oct. 2012, 8 pages.

ITU-R, "Reference Electro-Optical Transfer Function for Flat Panel Displays Used in HDTV Studio Production", Recommendation ITU-R BT.1886, BT Series, Broadcasting Service (Television), Mar. 2011, 7 pages.

ITU-T, "Advanced Video Coding for Generic Audiovisual Services", ITU-T Recommendation H.264, Nov. 2007, 564 pages.

ITU-T, "Transmission of Non-Telephone Signals-Video Coding for Low Bit Rate Communication ITU-T", ITU-T Recommendation H.263, Mar. 1996, 52 pages.

(56) References Cited

OTHER PUBLICATIONS

Laksono, Indra, "Hardware Implementation of HDR Video Decoding and Display System", M36162, Geneva, Switzerland, Feb. 2015, 6 pages.

Leannec et al., "Modulation Channel Information SEI Message", M33776, Sapporo, JP, Jul. 2014, 13 pages.

Luthra et al., "Call for 1000 and 4000 Nits Peak Brightness Test Material for HDR and WCG Video Coding", ISO/IEC JTC1/SC29/WG11 MPEG2014/N15099, Geneva, Switzerland, Feb. 2015, 2 pages.

Luthra et al., "Call for Evidence (CfE) for HDR and WCG Video Coding", ISO/IEC JTC1/SC29/WG11, Doc. N15083, Geneva, Switzerland, Feb. 2015, 46 pages.

Luthra et al., "Requirements and Use Cases for HDR and WCG Content Coding", ISO/IEC JTC1/SC29/WG11 MPEG2014/N15084, Geneva, Switzerland, Feb. 2015, 13 pages.

Luthra et al., "Use Cases of the Scalable Enhancement of HEVC", ISO/IEC JTC1/SC29/WG11 N12955, Jul. 2012, Stockholm, Sweden, 8 pages.

Mantiuk et al., "HDR-VDP-2: A Calibrated Visual Metric for Visibility and Quality Predictions in all Luminance Conditions", ACM Transactions on Graphics (TOG)-Proceedings of ACM SIGGRAPH 2011, vol. 30, No. 4, Jul. 2011, 13 pages.

Sharma et al., "The CIEDE2000 Color-Difference Formula: Implementation Notes, Supplementary Test Data, and Mathematical Observations", Color Research & Applications (Wiley Interscience), vol. 30, No. 1, Feb. 2005, pp. 21-30.

Sheikh et al., "Image Information and Visual Quality", IEEE Transactions on Image Processing, vol. 15, No. 2, Feb. 2006, pp. 430-444.

Smolic, A., "Informative Input on Temporally Coherent Local Tone Mapping of HDR Video", M35479, Geneva, Switzerland, Feb. 2015.

Smpte, "High Dynamic Range Electro-Optical Transfer Function of Mastering Reference Displays", Aug. 29, 2014, pp. 1-14—14 pages.

Smpte, "Mastering Display Color vol. Metadata Supporting High Luminance and Wide Color Gamut Images", ST 2086:2014, Oct. 30, 2014, pp. 1-6.

Stessen et al., "Chromaticity Based Color Signals", M34335, Sapporo, Japan, Jul. 2014, 16 pages.

Sullivan et al., "Standardized Extensions of High Efficiency Video Coding (HEVC)", IEEE Journal of Selected Topics in Signal Processing, vol. 7, No. 6, Dec. 2013, pp. 1001-1016.

Tourapis et al., "Exploration Experiment 3 on Objective Test Methods for HDR and Wcg Video Coding Evaluation", M35478, Geneva, Switzerland, Feb. 2015, 5 pages.

Tourapis et al., "HDRTools: Software Updates", ISO/IEC JTC1/SC29/WG11, Doc. M35471, Geneva, Switzerland, Feb. 2015, 2 pages.

Wikipedia, "Half-Precision Floating-Point Format", Available online at https://en.wikipedia.org/wiki/Half-precision_floating-point_format, retrieved on Oct. 12, 2017, 5 pages.

Baylon et al., "Response to Call for Evidence for HDR and WCG Video Coding: Arris, Dolby and InterDigital", Arris Inc., Dolby Laboratories Inc. and Inter Digital Communications, LLC, ISO/IEC JTC1/SC29/WG 11 MPEG2015/M36264, Warsaw, Poland, Jun. 2015, 9 pages.

Chen et al., "Chroma Intra Prediction by Reconstructed Luma Samples", Document No. JCTVC-C206, Samsung Electronics Co., Ltd., Joint Collaborative Team on Video Coding (JCT-VC) of ITU-T SG16 WP3 and ISO/IEC JTC1/SC29/WG11, 3rd Meeting: Guangzhou, CN, Oct. 7-15, 2010, pp. 1-7.

Dong et al., "Cross-Plane Chroma Enhancement for SHVC Inter-Layer Prediction", IEEE, Picture Coding Symposium (PCS), Dec. 2013, pp. 309-312.

Dong et al., "SCE4: Results of Test 4.2.4 on Chroma Enhancement for Inter Layer Prediction", Document No. JCTVC-M0183_r2, InterDigital Communications, Inc., Joint Collaborative Team on Video Coding (JCT-VC) of ITU-T SG 16 WP 3 and ISO/IEC JTC 1/SC 29/WG 11, 13th Meeting: Incheon, KR, Apr. 18-26, 2013, pp. 1-18.

Dong et al., "SEI Message: Post Filters to Enhance the Chroma Planes", Document No. JCTVC-N0224 r1, InterDigital Communications, Inc., Joint Collaborative Team on Video Coding (JCT-VC) of ITU-T SG 16 WP 3 and ISO/IEC JTC 1/SC 29/WG 11, 14th Meeting: Vienna. AT, Jul. 25-Aug. 2, 2013, pp. 1-9.

ISO/IEC, "Information Technology—Generic Coding of Moving Pictures and Associated Audio Information: Video", ISO/IEC 13818-2, Dec. 2000, 220 pages.

ITU-T, "Video Coding for Low Bit Rate Communication", H.263, Series H: Audiovisual and Multimedia Systems, Infrastructure of Audiovisual Services—Coding of Moving Video, Jan. 2005, 226 pages.

Lainema et al., "Intra Coding of the HEVC Standard", IEEE Transactions on Circuits and Systems for Video Technology, vol. 22, No. 12, Dec. 2012, pp. 1792-1801.

McCann et al., "High Efficiency Video Coding (HEVC) Test Model 16 (HM 16) Improved Encoder Description", Document No. JCTVC-S1002, Joint Collaborative Team on Video Coding (JCT-VC) of ITU-T SG16 WP3 and ISO/IEC JTC1/SC29/WG11, 19th Meeting: Strasbourg, FR, Oct. 17-24, 2014, 54 pages.

Yin et al., "Candidate Test Model for HDR extension of HEVC", Dolby Laboratories Inc. and InterDigital Communications, LLC, ISO/IEC JTC1/SC29/WG11 MPEG2014/ m37269, Geneva, CH, Oct. 2015, 6 pages.

Li, Xiang et al., "Non-SCE4: Simplification of chroma enhancement for inter layer reference picture generation", Joint Collaborative Team on Video Coding (JCT-VC) of ITU-T SG 16 WP 3 and ISO/IEC JTC 1/SC 29/WG 11, JCTVC-M0253, Apr. 18-26, 2013, 4 pages.

* cited by examiner

| 0 | 3 | 5 | 2 |
|---|---|---|---|
| 1 | 4 | 4 | 1 |
| 2 | 5 | 3 | 0 |

FIG. 12E

| 0 | 2 | 4 | 6 |
|---|---|---|---|
| 1 | 3 | 5 | 7 |
| 0 | 2 | 4 | 6 |

FIG. 12D

| 0 | 3 | 3 | 0 |
|---|---|---|---|
| 1 | 4 | 4 | 1 |
| 2 | 5 | 5 | 2 |

FIG. 12C

| 0 | 2 | 2 | 0 |
|---|---|---|---|
| 1 | 3 | 3 | 1 |
| 0 | 2 | 2 | 0 |

FIG. 12B

| 0 | 3 | 6 | 9 |
|---|---|---|---|
| 1 | 4 | 7 | 10 |
| 2 | 5 | 8 | 11 |

FIG. 12A

Horizontal Filter: 0 | 1 | 0

Vertical Filter: 2 | 3 | 3 | 2

FIG. 13B

Horizontal Filter: 0 | 1 | 2

Vertical Filter: 3 | 4 | 5 | 6

FIG. 13A

| cross_plane_filter_coeff() { | Descriptor |
|---|---|
| num_coeff_hori_minus1 | ue() |
| num_coeff_vert_minus1 | ue() |
| num_coeff_reduced_flag | u(1) |
| for ( i=0; i< (num_coeff_hori_minus1+1)×(num_coeff_vert_minus1+1) <br> −4×num_coeff_reduced_flag −1; i++ ) | |
| filter_coeff_plus8 [i] | u(4) |
| scaling_factor_abs_minus1 | u(10) |
| scaling_factor_sign | u(1) |
| bit_shifting | u(5) |
| } | |

FIG. 14

| | Descriptor |
|---|---|
| cross_plane_filter (payloadSize) { | |
|   cross_plane_filter_enabled_flag | u(1) |
|   if (cross_plane_filter_enabled_flag) { | |
|     cb_num_of_filter_sets | ue() |
|     if (cb_num_of_filter_sets > 0 ) { | |
|       for ( i = 0; i < cb_num_of_filter_sets; i++) | |
|         cb_filter_coeff [i] = cross_plane_filter_coeff (); | |
|     } | |
|     cr_num_of_filter_sets | ue() |
|     if (cr_num_of_filter_sets > 0 ) { | |
|       for ( i = 0; i < cr_num_of_filter_sets; i++) | |
|         cr_filter_coeff [i] = cross_plane_filter_coeff (); | |
|     } | |
|   } | |
| } | |

FIG. 16

| cross_plane_filtering_region_info ( ) { | Descriptor |
|---|---|
| top_offset | ue() |
| left_offset | ue() |
| right_offset | ue() |
| bottom_offset | ue() |
| cb_filtering_enabled_flag | u(1) |
| if(cb_filtering_enabled_flag) { | |
|    cb_filter_idx | ue() |
| } | |
| cr_filtering_enabled_flag | u(1) |
| if(cr_filtering_enabled_flag) { | |
|    cr_filter_idx | ue() |
| } | |
| } | |

FIG. 17

| | |
|---|---|
| if (cross_plane_filter_enabled_flag) { | |
|   cb_num_of_filter_sets | ue() |
|   if (cb_num_of_filter_sets > 0 ) { | |
|     for (i = 0; i < cb_num_of_filter_sets; i++) | |
|       cb_filter_coeff [i] = cross_plane_filter_coeff (); | |
|     cb_num_of_regions_minus1 | ue() |
|     for (i = 0; i < cb_num_of_regions_minus1+1; i++) | |
|       cb_region_info [i] = cross_plane_filtering_region_info (); | |
|   } | |
|   cr_num_of_filter_sets | ue() |
|   if (cr_num_of_filter_sets > 0 ) { | |
|     for (i = 0; i < cr_num_of_filter_sets; i++) | |
|       cr_filter_coeff [i] = cross_plane_filter_coeff (); | |
|     cr_num_of_regions_minus1 | ue() |
|     for (i = 0; i < cr_num_of_filter_sets_minus1+1; i++) | |
|       cr_region_info [i] = cross_plane_filtering_region_info (); | |
|   } | |
| } | |

FIG. 19

CROSS-PLANE FILTERING FOR CHROMA SIGNAL ENHANCEMENT IN VIDEO CODING

CROSS-REFERENCE TO RELATED APPLICATIONS

This application claims priority to U.S. provisional patent application Nos. 61/707,682, filed Sep. 28, 2012, 61/762,611, filed Feb. 8, 2013, 61/778,218, filed Mar. 12, 2013, and 61/845,792, filed Jul. 12, 2013, which are incorporated herein by reference in their entireties.

BACKGROUND

Video coding systems are often used to compress digital video signals, for instance to reduce storage space consumed and/or to reduce transmission bandwidth consumption associated with such signals. For example, block-based hybrid video coding systems are widely deployed and frequently used.

Digital video signals typically have three color planes including a luma plane, a blue-difference chroma plane, and a red-difference chroma plane. Pixels of the chroma planes typically have smaller dynamic ranges than pixels of the luma plane, such that the chroma planes of a video image are typically smoother and/or have less detail than the luma plane. A chroma block of a video image may thus be easier to accurately predict, for example consuming fewer resources and/or resulting in less prediction error.

However video coding using known chroma prediction techniques may result in video images with significantly blurred edges and/or textures in the chroma planes.

SUMMARY

Cross-plane filtering may be used to restore blurred edges and/or textures in one or both chroma planes using information from a corresponding luma plane. Adaptive cross-plane filters may be implemented. Cross-plane filter coefficients may be quantized and/or signaled such that overhead in a bitstream is affordable (e.g., reduced and/or minimized) without performance degradation. One or more characteristics of a cross-plane filter (e.g., size, separability, symmetry, etc.) may be determined such that overhead in a bitstream is affordable (e.g., reduced and/or minimized) without performance degradation. Cross-plane filtering may be applied to videos with various color subsampling formats (e.g., 4:4:4, 4:2:2, and 4:2:0). Cross-plane filtering may be applied to select regions of a video image, for example to edge areas and/or to areas specified by one or more parameters signaled in a bitstream. Cross-plane filters may be implemented in single-layer video coding systems and/or multi-layer video coding systems.

An example video decoding process in accordance with cross-plane filtering may include receiving a video signal and a cross-plane filter that is associated with the video signal. The video decoding process may include applying the cross-plane filter to a luma plane pixel of the video signal to determine a chroma offset. The video decoding process may include adding the chroma offset to a corresponding chroma plane pixel of the video signal.

A video coding device may be configured for cross-plane filtering. The video coding device may include a network interface that is configured to receive a video signal and a cross-plane filter that is associated with the video signal. The video coding device may include a processor that is configured to apply the cross-plane filter to a luma plane pixel of the video signal to determine a chroma offset. The processor may be configured to add the chroma offset to a corresponding chroma plane pixel of the video signal.

An example video encoding process in accordance with cross-plane filtering may include receiving a video signal. The video encoding process may include generating a cross-plane filter using components of the video signal. The video encoding process may include quantizing a filter coefficient associated with the cross-plane filter. The video encoding process may include encoding the filter coefficient into a bitstream that is representative of the video signal. The video encoding process may include transmitting the bitstream.

A video coding device may be configured for cross-plane filtering. The video coding device may include a network interface that is configured to receive a video signal. The video coding device may include a processor that is configured to generate a cross-plane filter using components of the video signal. The processor may be configured to quantize a filter coefficient associated with the cross-plane filter. The processor may be configured to encode the filter coefficient into a bitstream that is representative of the video signal. The processor may be configured to transmit the bitstream, for example via the network interface.

BRIEF DESCRIPTION OF THE DRAWINGS

FIG. 12A depicts an example lack of symmetry property of an example cross-plane filter.

FIG. 12B depicts an example horizontal and vertical symmetry property of an example cross-plane filter.

FIG. 12C depicts an example vertical symmetry property of an example cross-plane filter.

FIG. 12D depicts an example horizontal symmetry property of an example cross-plane filter.

FIG. 12E depicts an example point symmetry property of an example cross-plane filter.

FIG. 13A depicts example horizontal and vertical one-dimensional filters without symmetry.

FIG. 13B depicts example horizontal and vertical one-dimensional filters with symmetry.

FIG. 14 is an example syntax table that illustrates an example of signaling a set of cross-plane filter coefficients.

FIG. 16 is an example syntax table that illustrates an example of signaling multiple sets of cross-plane filter coefficients.

FIG. 17 is an example syntax table that illustrates an example of signaling information that specifies a region for cross-plane filtering.

FIG. 19 is an example syntax table that illustrates an example of signaling information pertaining to multiple regions together with multiple sets of cross-plane filter coefficients.

DETAILED DESCRIPTION

Figure 1:
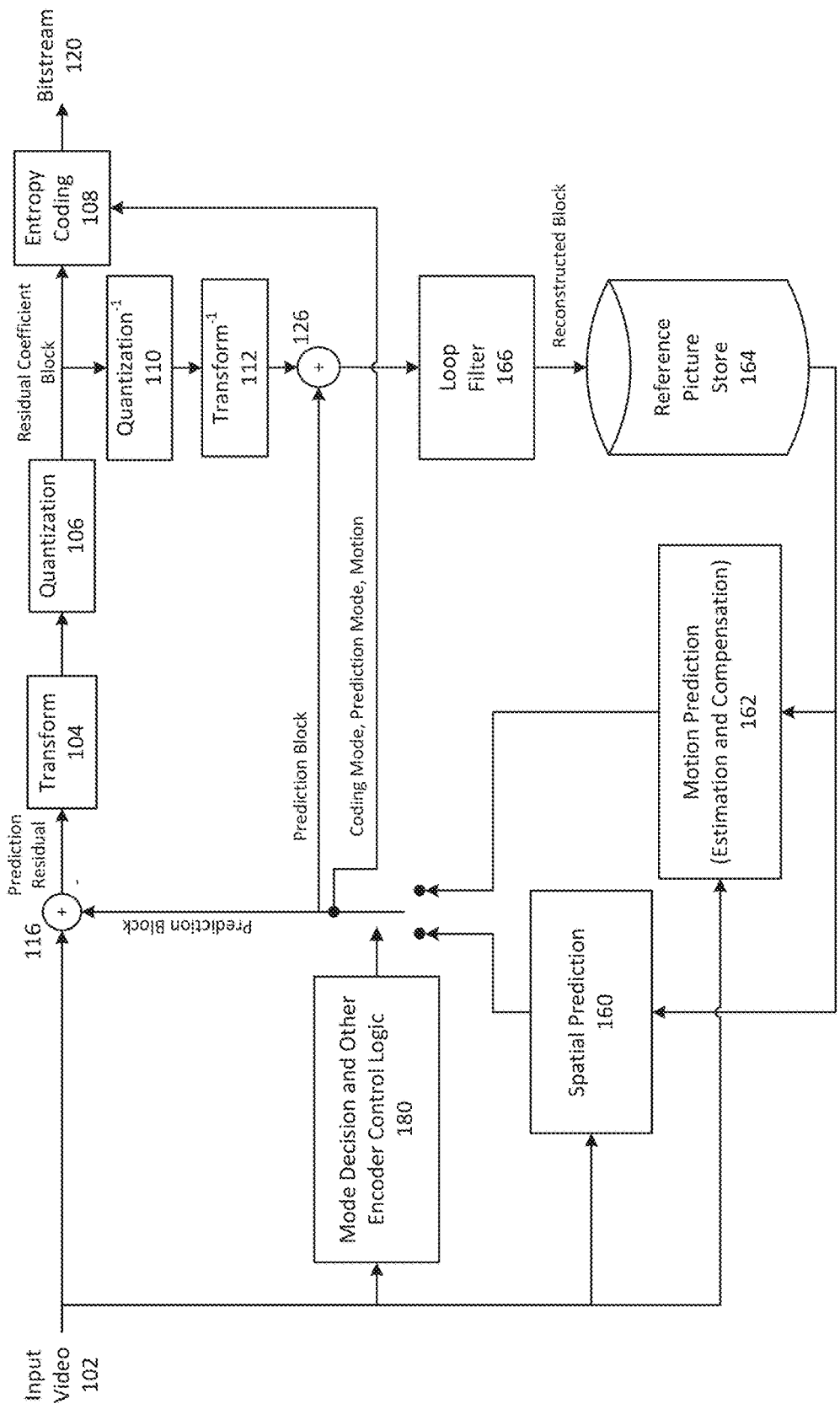
FIG. 1 is a block diagram illustrating an example block-based video encoder.

FIG. 1 illustrates an example block-based video encoder. An input video signal 102 may be processed, for example block by block. A video block unit may comprise 16×16 pixels. Such a block unit may be referred to as a macroblock (MB). A video block unit size may be extended, for example to 64×64 pixels. Extended size video blocks may be used to compress high resolution video signals (e.g., 1080 p video signals and beyond). Extended block sizes may be referred to as coding units (CUs). A CU may be partitioned into one or more prediction units (PUs), for which separate prediction methods may be applied.

For one or more input video blocks (e.g., each input video block), such as MBs or CUs, spatial prediction 160 and/or temporal prediction 162 may be performed. Spatial prediction 160, which may be referred to as intra prediction, may use pixels from one or more already coded neighboring blocks in a video picture and/or slice, for example to predict a video block. Spatial prediction 160 may reduce spatial redundancy that may be inherent in a video signal. Temporal prediction 162, which may be referred to as inter prediction and/or motion compensated prediction may use pixels from one or more already coded video pictures, for example to predict a video block. Temporal prediction may reduce temporal redundancy that may be inherent in a video signal. A temporal prediction signal for a video block may include one or more motion vectors and/or one or more reference picture indexes, for example if multiple reference pictures are used, in order to identify from which reference pictures in a reference picture store 164 the temporal prediction signal may originate.

After spatial prediction and/or temporal prediction are performed, a mode decision block 180 (e.g., in an encoder) may choose a prediction mode, for example based on a rate-distortion optimization method. A prediction block may be subtracted from a video block 116. A prediction residual may be transformed 104 and/or quantized 106. One or more quantized residual coefficients may be inverse quantized 110 and/or inverse transformed 112, for example to form a reconstructed residual. The reconstructed residual may be added to a prediction block 126, for example to form a reconstructed video block.

Further in-loop filtering, such as one or more deblocking filters and/or Adaptive Loop Filters 166 may be applied on the reconstructed video block, for example before it is stored in the reference picture store 164 and/or used to code subsequent video blocks. To form an output video bitstream 120, a coding mode (e.g., inter or intra), prediction mode information, motion information, and/or quantized residual coefficients may be sent to an entropy coding unit 108, for example to be further compressed and/or packed to form the bitstream 120.

Figure 2:
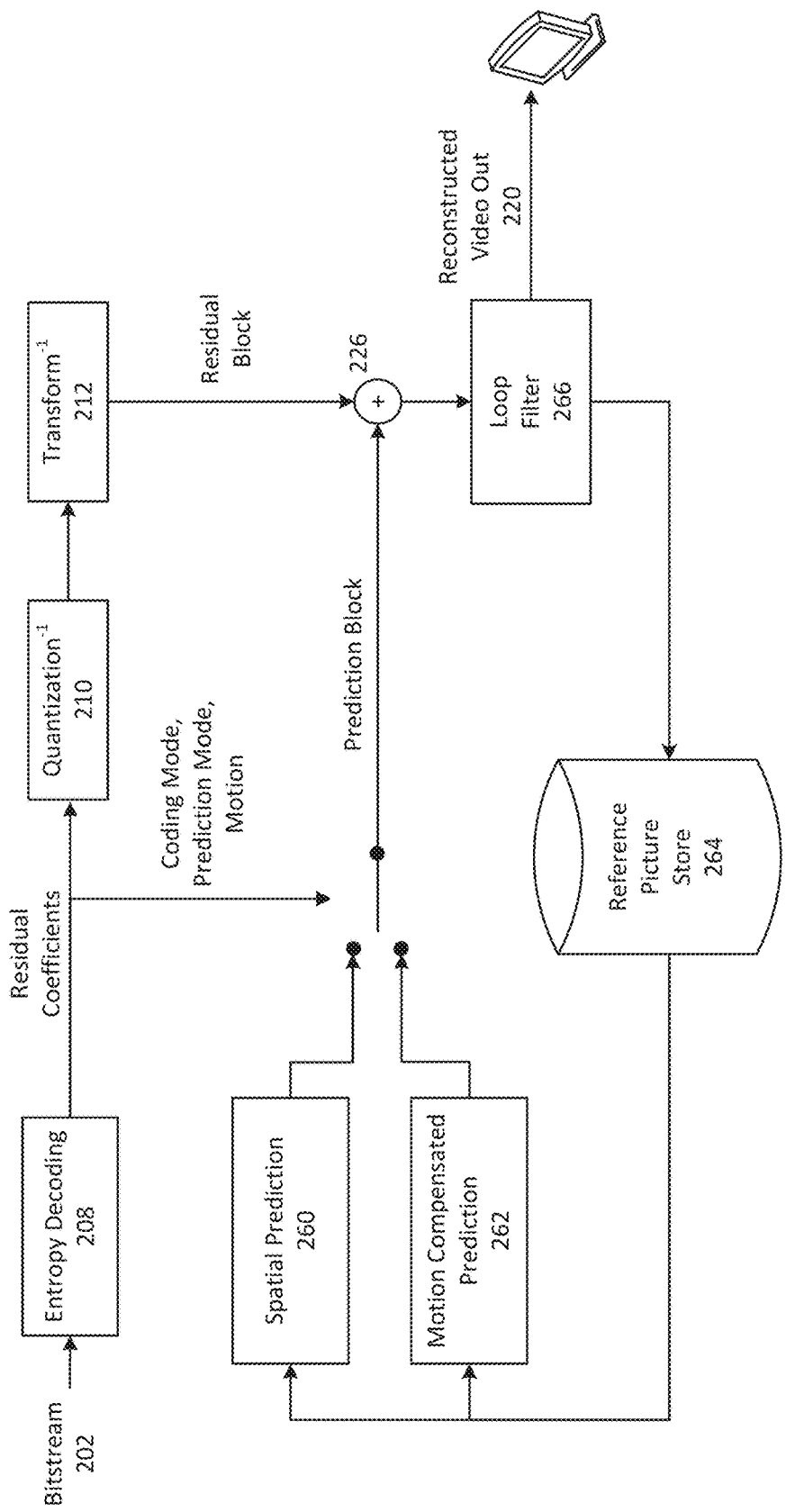
FIG. 2 is a block diagram illustrating an example block-based video decoder.

FIG. 2 illustrates an example block-based video decoder that may correspond to the block-based encoder depicted in FIG. 1. A video bitstream 202 may be unpacked and/or entropy decoded, for example at an entropy decoding unit 208. A coding mode and/or prediction information may be sent to a spatial prediction unit 260 (e.g., for intra coding) or a temporal prediction unit 262 (e.g., for inter coding), for example to form a prediction block. One or more residual transform coefficients may be sent to an inverse quantization unit 210 and/or an inverse transform unit 212, for example to reconstruct a residual block. The prediction block and the residual block may be added together at 226, for example to form a reconstructed block. The reconstructed block may be processed through in-loop filtering (e.g., using a loop filter 266), for example before being added to a reconstructed output video 220 to be transmitted (e.g., to a display device) and/or before being stored in a reference picture store 264, for example for use in predicting one or more subsequent video blocks.

Video may be consumed on devices with varying capabilities in terms of computing power, memory and/or storage size, display resolution, display frame rate, etc., for example by smart phones and/or tablets. Network and/or transmission channels may have varying characteristics in terms of packet loss rate, available channel bandwidth, burst error rate, etc. Video data may be transmitted over a combination of wired networks and/or wireless networks, which may complicate one or more underlying video transmission channel characteristics. In such scenarios, scalable video coding may improve a video quality provided by video applications, for instance video quality provided by video applications running on devices with different capabilities over heterogeneous networks.

Scalable video coding may encode a video signal in accordance with a highest representation (e.g., temporal resolution, spatial resolution, quality, etc.), but may enable decoding from respective subsets of one or more video streams, for example in accordance with a specified rate and/or representation employed by one or more applications running on a client device. Scalable video coding may enable bandwidth and/or storage savings.

Figure 3:
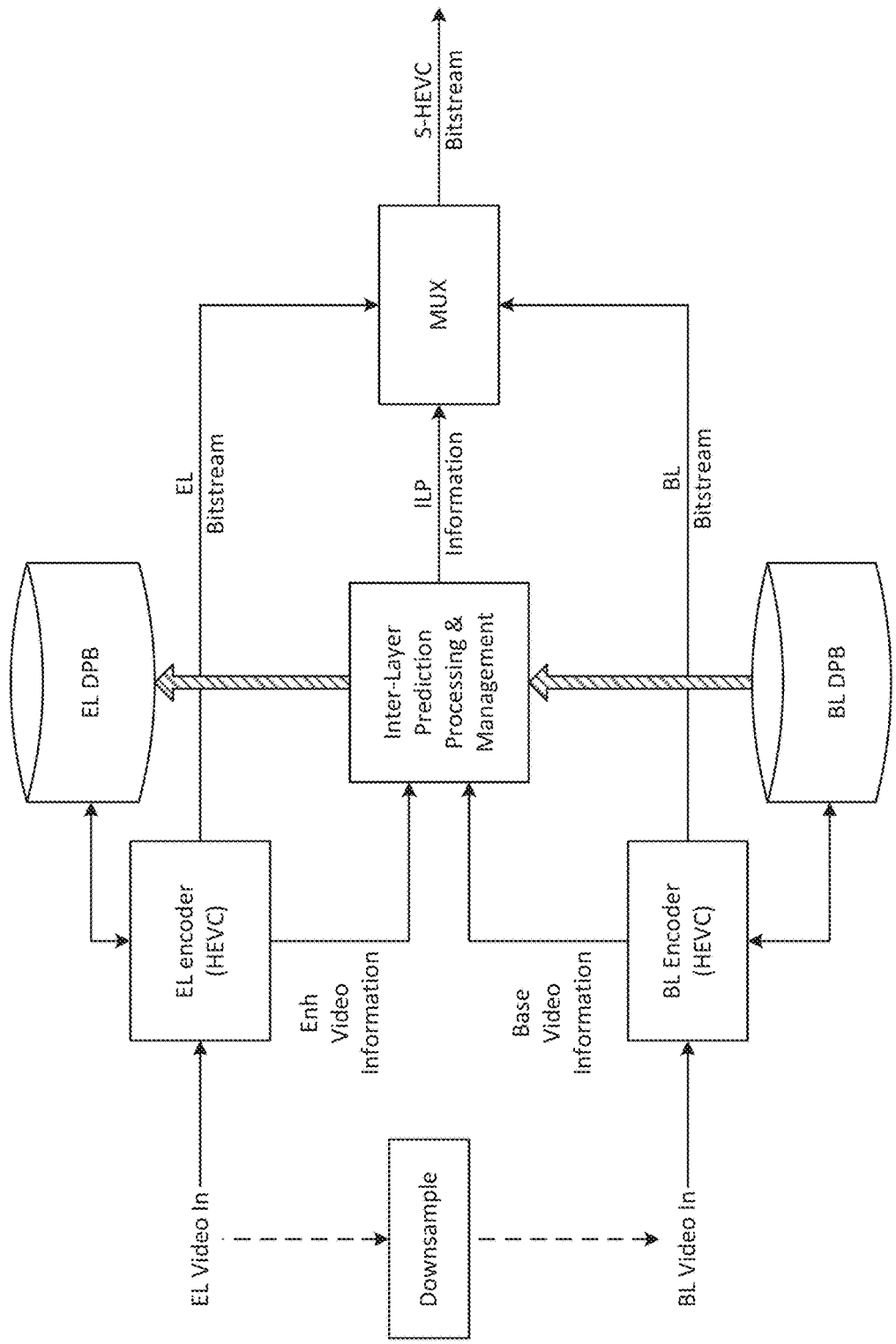
FIG. 3 is a block diagram illustrating an example two-layer spatial scalable video encoder.

FIG. 3 illustrates an example two-layer scalable video coding system having one base layer (BL) and one enhancement layer (EL). Spatial resolutions between the two layers may be different, such that spatial scalability may be applied. A base layer encoder (e.g., a High Efficiency Video Coding (HEVC) encoder) may encode a base layer video input, for example block by block, and may generate a base layer bitstream (e.g., in accordance with the block diagram depicted in FIG. 1). An enhancement layer encoder may encode an enhancement layer video input, for example block by block, and may generates an enhancement layer bitstream (e.g., in accordance with the block diagram depicted in FIG. 1). A coding efficiency of a scalable video coding system (e.g., the coding efficiency of enhancement layer coding) may be improved. For example, signal correlation from a base layer reconstructed video may be used to improve prediction accuracy.

A base layer reconstructed video may be processed such that at least portions of one or more processed base layer pictures may be inserted into an enhancement layer Decoded Picture Buffer (EL DPB) and/or used to predict an enhancement layer video input. A base layer video and an enhancement layer video may be substantially the same video source represented in respective different spatial resolutions, such that they correspond to each other via a downsampling process, for example. Inter-layer prediction (ILP) processing may be carried out by an inter-layer processing and/or management unit, such as an upsampling operation that may be used to align a spatial resolution of a base layer reconstruction with that of an enhancement layer video. A scalable video coding bitstream may include a base layer bitstream, an enhancement layer bitstream produced by the base and enhancement layer encoders, and/or inter-layer prediction information.

Inter-layer prediction information may be produced by the ILP processing and management unit. For example, ILP information may include one or more of the following: a type of inter-layer processing applied; one or more parameters used in the processing (e.g., which upsampling filters are used); which of one or more processed base layer pictures should be inserted into an EL DPB; etc. The base and enhancement layer bitstreams and/or the ILP information may be multiplexed together, for example to form a scalable bitstream (e.g., an SHVC bitstream).

Figure 4:
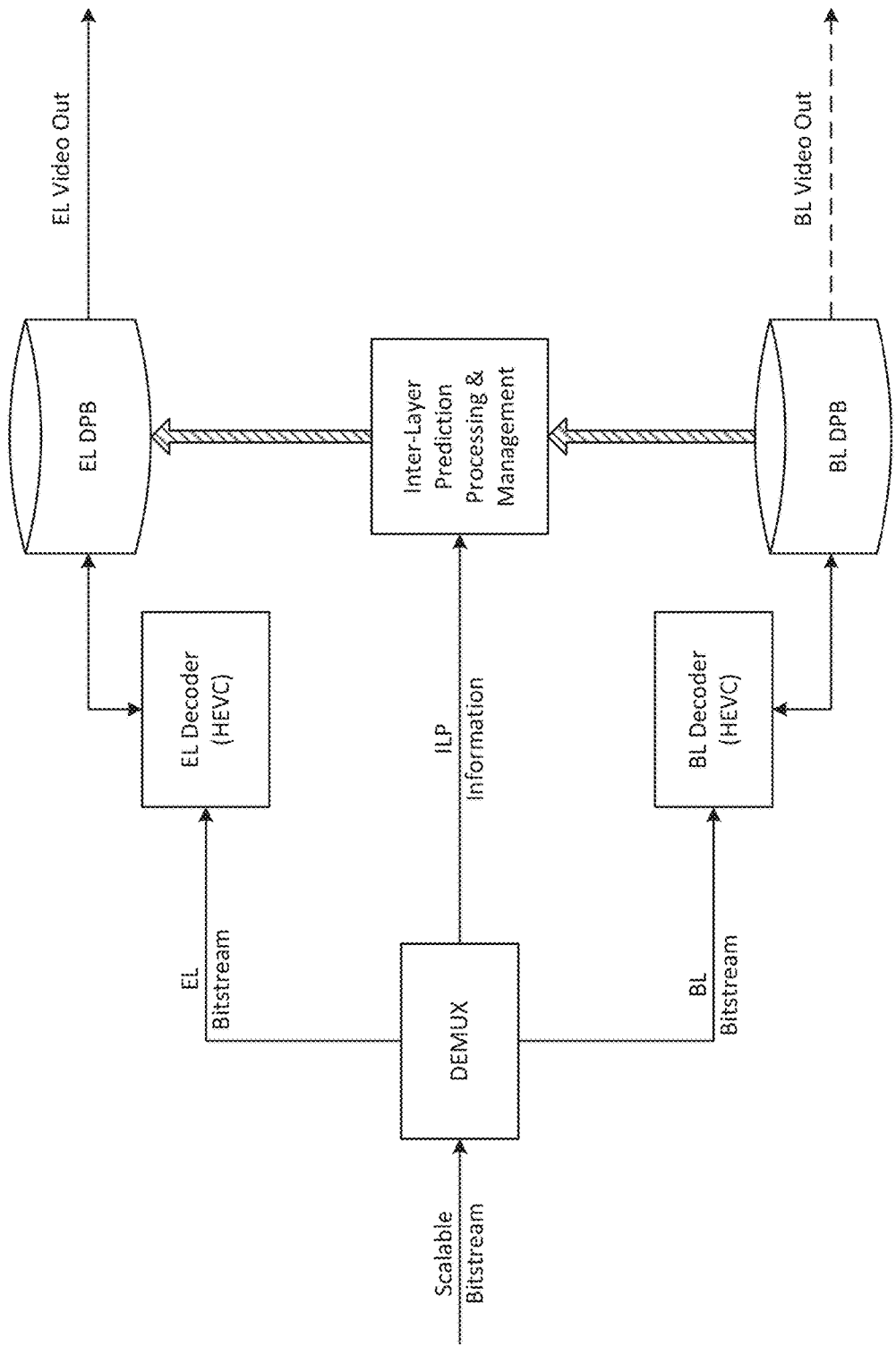
FIG. 4 is a block diagram illustrating an example two-layer spatial scalable video decoder.

FIG. 4 illustrates an example two-layer scalable video decoder that may correspond to the scalable encoder depicted in FIG. 3. The decoder may perform one or more operations, for example in a reverse order relative to the encoder. The scalable bitstream may be de-multiplexed into a base layer bitstream, an enhancement layer bitstream, and/or the ILP information. The base layer decoder may decode a base layer bitstream and/or may produce a base layer reconstruction.

The ILP processing and management unit may receive the ILP information and/or may process the base layer reconstruction, for example in accordance with the received ILP information. The ILP processing and management unit may selectively insert one or more processed base layer pictures into an EL DPB, for example in accordance with the received ILP information. An enhancement layer decoder may decode the enhancement layer bitstream, for example with a combination of temporal reference pictures and/or inter-layer reference pictures (e.g., one or more processed base layer pictures), in order to reconstruct an enhancement layer video. For the purposes of the instant disclosure, the terms "inter layer reference picture" and "processed base layer pictures" may be used interchangeably.

Figure 5:
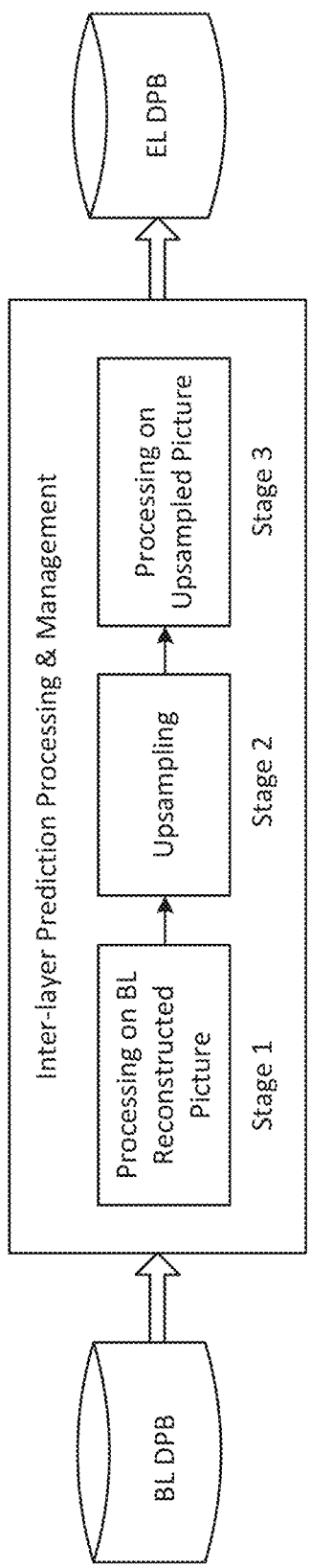
FIG. 5 is a block diagram of an example inter-layer prediction processing and management unit.

FIG. 5 depicts an example inter-layer prediction and processing management unit, for example as may be implemented in the example two-layer spatial scalable video encoder depicted in FIG. 3 and/or the example two-layer spatial scalable video decoder depicted in FIG. 4. The inter-layer prediction and processing management unit may include one or more stages (e.g., three stages as depicted in FIG. 5). In a first stage (e.g., Stage 1), the BL reconstructed picture may be enhanced (e.g., before it is upsampled). In a second stage (e.g., Stage 2), upsampling may be performed (e.g., when a resolution of the BL is lower than a resolution of the EL in spatial scalability). An output of the second stage may have a resolution that is substantially the same as that of the EL with a sampling grid aligned. An enhancement may be performed in a third stage (e.g., Stage 3), for example before the upsampled picture is put in the EL DPB, which may improve inter-layer reference picture quality.

None, one, or more of the above-described three stages may be performed by the inter-layer prediction and processing management unit. For example, in signal-to-noise ratio (SNR) scalability, where a BL picture may have substantially the same resolution as an EL picture but with lower quality, one or more of the above-described three stages (e.g., all the stages) may not be performed, for example such that the BL reconstructed picture may be inserted into EL DPB directly for inter-layer prediction. In spatial scalability, the second stage may be performed, for example to make an upsampled BL reconstructed picture have an aligned sampling grid relative to an EL picture. The first and third stages may be performed to improve inter-layer reference picture quality, which may help achieve higher efficiency in EL coding, for example.

Performing picture level ILP in a scalable video coding system (e.g., as illustrated in FIGS. 3 and 4) may reduce implementation complexity, for example because respective base layer and/or enhancement layer encoder and/or decoder logics, for example at a block level, may be at least partially reused without changes. High level (e.g., picture and/or slice level) configurations may implement insertion of one or more respective processed base layer pictures into an enhancement layer DPB. To improve coding efficiency, one or more block level changes may be allowed in the scalable system, for example in order to facilitate block-level inter-layer prediction, which may be in addition to picture level inter-layer prediction.

The herein described single and/or multi-layer video coding systems may be used for coding color videos. In a color video, each pixel carrying luminance and chrominance information may be made of a combination of respective intensities of primary colors (e.g., YCbCr, RGB, or YUV). Each video frame of a color video may be composed of three rectangular arrays, corresponding to three color channels. One or more samples in a color channel (e.g., each color channel) may have discrete and/or finite magnitudes, which in digital video applications may be represented using 8-bit values. The red, green, and blue (RGB) primary may be used in video capture and/or display systems.

In video coding and/or transmission, video signals in the RGB space may be converted into one or more other color spaces (e.g., with luminance and/or chrominance coordinates), such as YUV, for PAL and SECAM TV systems, and YIQ for NTSC TV systems, for example to reduce bandwidth consumption and/or for compatibility with monochrome video applications. A value of a Y component may represent a brightness of a pixel, while the other two components (e.g., Cb and Cr) may bear chrominance information. A digital color space (e.g., YCbCr) may be a scaled and/or shifted version of an analog color space (e.g., YUV). A transformation matrix for deriving a YCbCr coordinate from an RGB coordinate may be represented as equation (1).

$$\begin{bmatrix} Y \\ Cb \\ Cr \end{bmatrix} = \begin{bmatrix} 0.257 & 0.504 & 0.098 \\ -0.148 & -0.291 & 0.439 \\ 0.439 & -0.368 & -0.071 \end{bmatrix} \begin{bmatrix} R \\ G \\ B \end{bmatrix} + \begin{bmatrix} 16 \\ 128 \\ 128 \end{bmatrix} \quad (1)$$

Figure 6C:
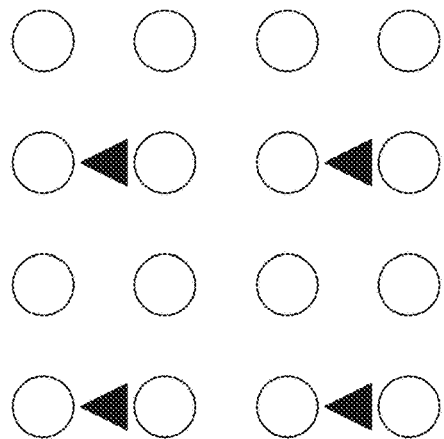
FIG. 6C depicts an example 4:2:0 color subsampling format.
Figure 6B:
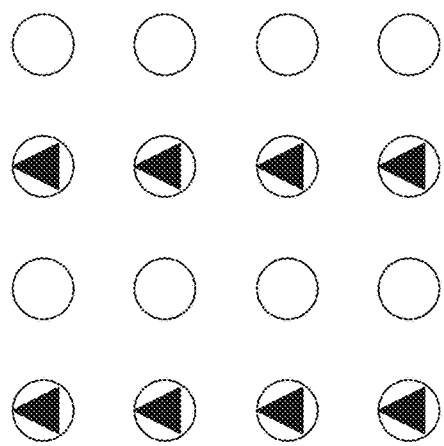
FIG. 6B depicts an example 4:2:2 color subsampling format.
Figure 6A:
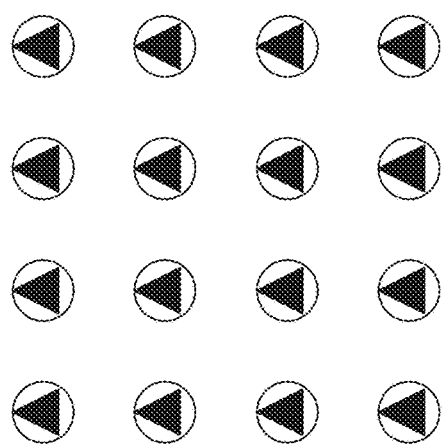
FIG. 6A depicts an example 4:4:4 color subsampling format.

Because the human vision system (HVS) may be less sensitive to color than to brightness, the chrominance components Cb and Cr may be subsampled with little degradation of perceived video quality. A color subsampling format may be indicated by a triplet of digits separated by colons. For example, in accordance with a 4:2:2 color subsampling format, a horizontal sampling rate for chrominance components may reduce to half while a vertical sampling rate may be unchanged. In accordance with a 4:2:0 color subsampling format, in order to reduce an associated data rate the sampling rate for chrominance components may be reduced to half in both horizontal and vertical directions. In accordance with a 4:4:4 color subsampling format that may be used for applications using very high video quality, the chrominance components may have sampling rates substantially identical to the sampling rate used for the luminance component. Example sampling grids illustrating luminance and chrominance samples for the above-described color subsampling formats are depicted in FIGS. 6A-6C, respectively.

The Y, Cb, and Cr color planes of a frame in a video sequence may be correlated in content (e.g., highly correlated), but the two chroma planes may exhibit fewer textures and/or edges than the luma plane. The three color planes may share a same motion. When a block-based hybrid video coding system (e.g., in accordance with FIGS. 1 and 2) is applied to a color block, the three planes within the block may not be coded separately. If the color block is coded by inter prediction, the two chroma blocks may reuse motion information of the luma block, such as a motion vector and/or a reference index. If the color block is coded by intra prediction, the luma block may have more prediction directions to choose than do one or both of the two chroma blocks, for instance because luma blocks may have more diverse and/or stronger edges.

For example, in accordance with H.264/AVC intra prediction, luma blocks may have nine candidate directions, whereas chroma blocks may have four candidate directions. In accordance with HEVC intra prediction, chroma blocks may have four candidate directions, and luma blocks may have more than four candidate directions (e.g., thirty five candidate directions). Respective transform and/or quantization processes for the luma and/or chroma prediction errors may be performed separately, for example after intra or inter prediction. At low bit-rates (e.g., where a QP for a luma is larger than thirty four) a chroma may have a lighter quantization (e.g., a smaller quantization stepsize) than a corresponding luma, for example because the edges and/or textures in chroma planes may be more delicate and may suffer more from heavy quantization, which may cause visible artifacts, such as color bleeding.

A device that is configured to perform video coding (e.g., to encode and/or decode video signals) may be referred to as a video coding device. Such video coding devices may include video-capable devices, for example a television, a digital media player, a DVD player, a Blu-Ray™ player, a networked media player device, a desktop computer, a laptop personal computer, a tablet device, a mobile phone, a video conferencing system, a hardware and/or software based video encoding system, or the like. Such video coding devices may include wireless communications network elements, such as a wireless transmit/receive unit (WTRU), a base station, a gateway, or other network elements.

A video coding device may be configured to receive video signals (e.g., video bitstreams) via a network interface. A video coding device may have a wireless network interface, a wired network interface, or any combination thereof. For example, if the video coding device is a wireless communications network element (e.g., a wireless transmit receive unit (WTRU)), the network interface may be a transceiver of the WTRU. In another example, if the video coding device is a video-capable device that is not configured for wireless communication (e.g., a back-end rack encoder) the network interface may be a wired network connection (e.g., a fiber optic connection). In another example, the network interface may be an interface that is configured to communicate with a physical storage medium (e.g., an optical disk drive, a memory card interface, a direct connection to a video camera, or the like). It should be appreciated that the network interface is not limited to these examples, and that the network interface may include other interfaces that enable a video coding device to receive video signals.

A video coding device may be configured to perform cross-plane filtering on one or more video signals (e.g., a source video signal received by a network interface of the video coding device).

Cross-plane filtering may be used, for example, to restore blurred edges and/or textures in one or both chroma planes using information from a corresponding luma plane. Adaptive cross-plane filters may be implemented. Cross-plane filter coefficients may be quantized and/or signaled such that overhead in a bitstream reduces (e.g., minimizes) performance degradation, for example in accordance with a threshold level of transmission performance of a bitstream associated with the video signal. Cross-plane filter coefficients may be transmitted in the bitstream (e.g., an output video bitstream) and/or may be transmitted out of band with respect to the bitstream.

One or more characteristics of a cross-plane filter (e.g., size, separability, symmetry, etc.) may be determined such that overhead in a bitstream is affordable, without performance degradation. Cross-plane filtering may be applied to videos with various color subsampling formats (e.g., including 4:4:4, 4:2:2, and 4:2:0). Cross-plane filtering may be applied to select regions of a video image (e.g., to edge areas and/or to one or more that may be signaled in the bitstream). Cross-plane filters may be implemented in single-layer video coding systems. Cross-plane filters may be implemented in multi-layer video coding systems.

A luma plane may be used as guidance to improve the quality of one or both chroma planes. For example, one or more portions of information pertaining to a luma plane may be blended into corresponding chroma planes. For the purposes of the instant disclosure, the three color planes of an original (e.g., uncoded) video image may be denoted as Y_org, Cb_org, and Cr_org, respectively, and the three color planes of a coded version of the original video image may be denoted as Y_rec, Cb_rec, and Cr_rec, respectively.

Figure 7:
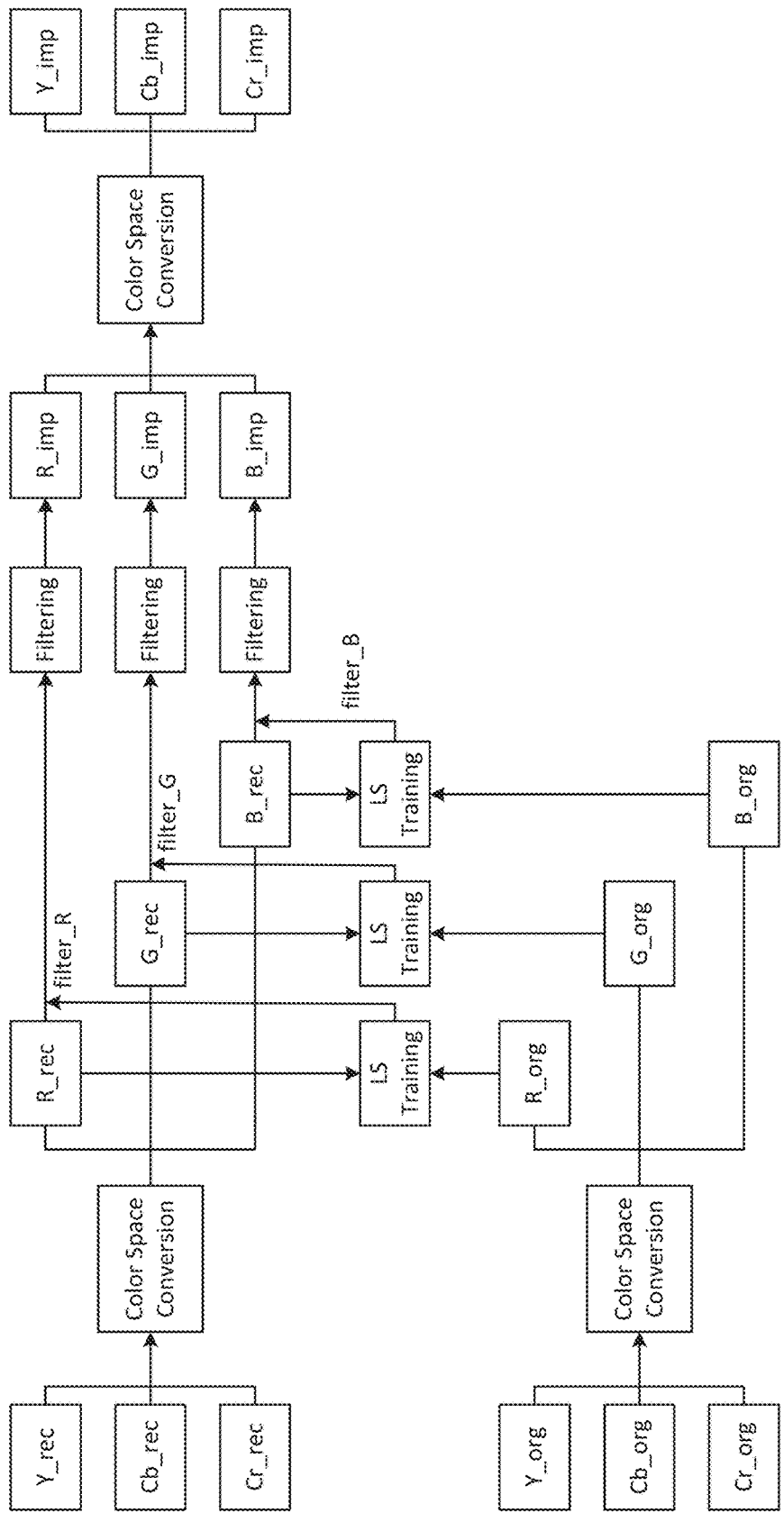
FIG. 7 is a block diagram illustrating an example of cross-plane filtering.

FIG. 7 illustrates an example of cross-plane filtering that may be used, for example, to transform Y_rec, Cb_rec, and Cr_rec back to an RGB space, where the three planes are denoted as R_rec, G_rec, and B_rec, respectively, using an inverse process (e.g., process (1) depicted above). Y_org, Cb_org, and Cr_org may be transformed back to an RGB space (e.g., at substantially the same time), such that respective original RGB planes may be obtained, denoted as R_org, G_org, and B_org. A least square (LS) training method may take plane pairs (R_org, R_rec), (G_org, G_rec), and (B_org, B_rec) as a training data set to train three filters for the R, G, and B planes, respectively, denoted as filter_R, filter_G, and filter_B. By using filter_R, filter_G, and filter_B to filter R_rec, G_rec, and B_rec, respectively, three improved RGB planes may be obtained, denoted as R_imp, G_imp, and B_imp, and/or distortions between R_org and R_imp, G_org and G_imp, and B_org and B_imp, respectively, may be reduced (e.g., minimized), compared with respective distortions between R_org and R_rec, G_org and G_rec, and B_org and B_rec. R_imp, G_imp, and B_imp may be transformed to the YCbCr space, and Y_imp, Cb_imp, and Cr_imp may be obtained, where Cb_imp and Cr_imp may be an output of the cross-plane filtering process.

Converting a color space, for example back and forth as illustrated in FIG. 7, may consume computational resources (e.g., an undesirably large amount of computational resources) of one or both of the encoder and/or decoder sides. Because the space converting processes and filtering processes are both linear, at least a portion of the illustrated cross-plane filtering procedure may be approximated, for example using a simplified process where one or more of the operations (e.g., all of the operations) are performed in the YCbCr space.

Figure 8A:
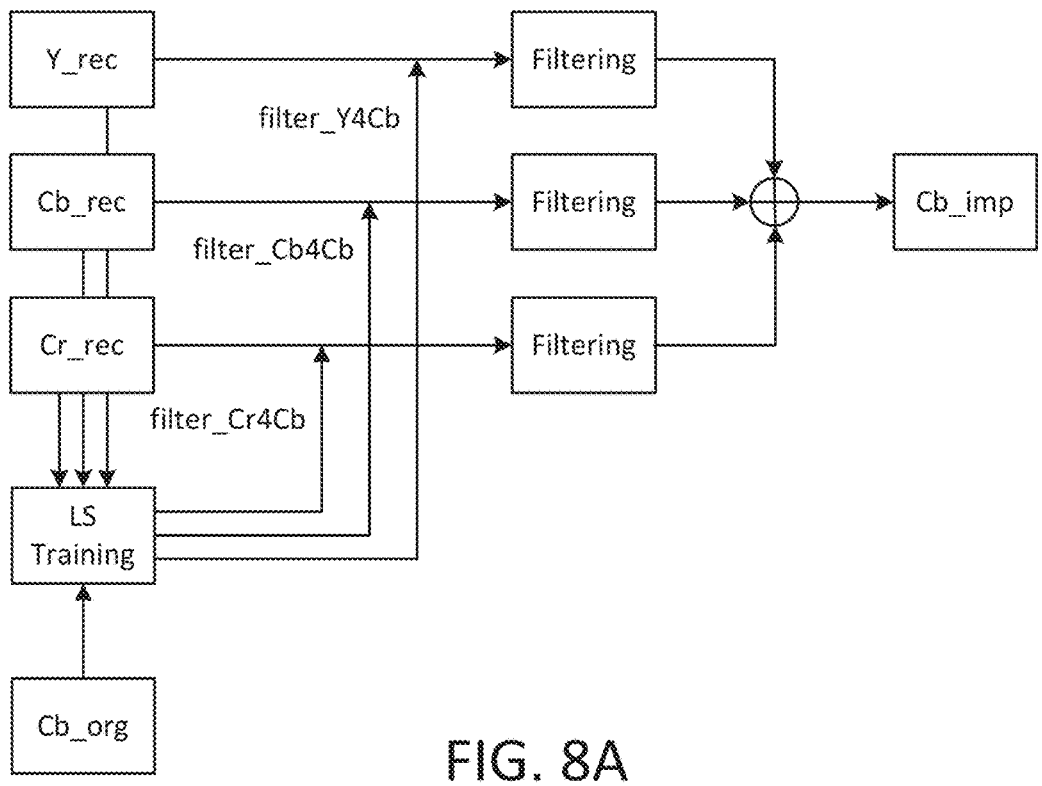
FIGS. 8A and 8B are block diagrams illustrating another example of cross-plane filtering.

As shown in FIG. 8A, in order to improve the quality of Cb_rec, an LS training module may take Y_rec, Cb_rec, Cr_rec, and Cb_org as a training data set and optimal filters filter_Y4Cb, filter_Cb4Cb, and filter_Cr4Cb, which may be jointly derived, may be applied to Y_rec, Cb_rec, and Cr_rec, respectively. Respective outputs of the filtering on the three planes may be added together, for example, to obtain an improved Cb plane, denoted as Cb_imp. The three optimal filters may be trained by the LS method such that distortion between Cb_imp and Cb_org may be minimized, for example in accordance with equation (2)

$$(filter_{Y4Cb}, filter_{Cb4Cb}, filter_{Cr4Cb}) = \arg\min E[(Y_{rec} \otimes filter_{Y4Cb} + Cb_{rec} \otimes filter_{Cb4Cb} + Cr_{rec} \otimes filter_{Cr4Cb} - Cb_{org})^2] \quad (2)$$

where $\otimes$ represents two dimensional (2-D) convolution, + and − represent matrix addition and subtraction, respectively, and $E[(X)^2]$ represents the mean of the square of each element in matrix X.

Figure 8B:
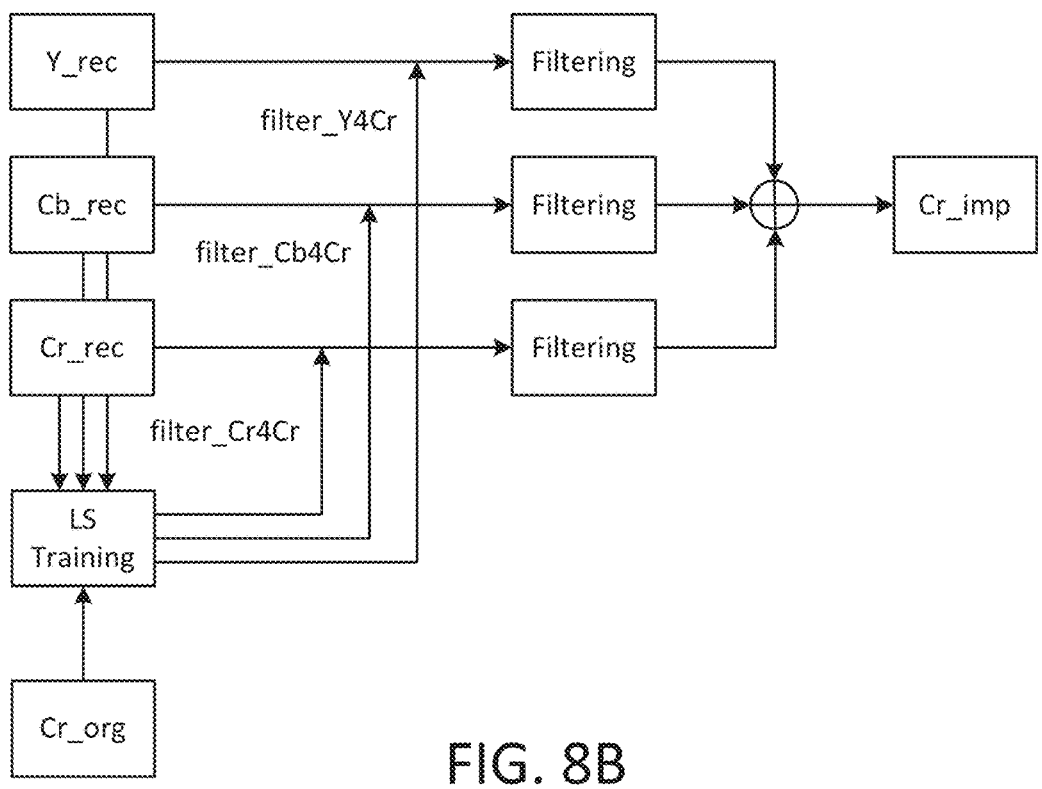

As shown FIG. 8B, in order to improve the quality of Cr_rec, an LS training module may take Y_rec, Cb_rec, Cr_rec, and Cr_org as a training data set and optimal filters filter_Y4Cr, filter_Cb4Cr, and filter_Cr4Cr, which may be jointly derived, may be applied to Y_rec, Cb_rec, and Cr_rec, respectively. Respective outputs of the filtering on the three planes may be added together, for example, to obtain an improved Cr plane, denoted Cr_imp. The three optimal filters may be trained by the LS method such that distortion between Cr_imp and Cr_org may be minimized, for example in accordance with equation (3).

$$(filter_{Y4Cr}, filter_{Cb4Cr}, filter_{Cr4Cr}) = \arg\min E[(Y_{rec} \otimes filter_{Y4Cr} + Cb_{rec} \otimes filter_{Cb4Cr} + Cr_{rec} \otimes filter_{Cr4Cr} - Cr_{org})^2] \quad (3)$$

Cr may contribute little to improving Cb. Cb may contribute little to improving Cr.

Figure 9A:
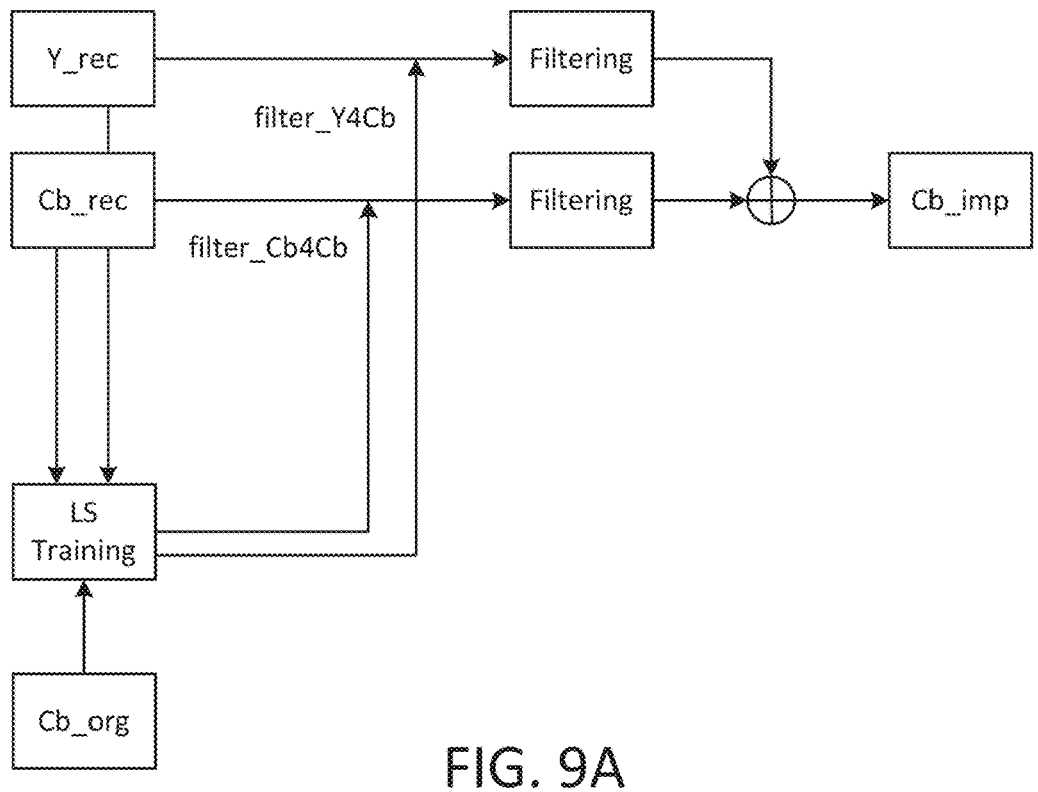
FIGS. 9A and 9B are block diagrams illustrating another example of cross-plane filtering.

The cross-plane filtering techniques illustrated in FIGS. 8A and 8B may be simplified. For example, as shown in FIG. 9A, the quality of a Cb plane may be improved by employing the Y and Cb planes, but not the Cr plane, in LS training, such that two filters, filter_Y4Cb and filter_Cb4Cb, may be jointly derived and may be applied to Y and Cb, respectively. Respective outputs of the filters may be added together, for example to obtain an improved Cb plane, denoted Cb_imp.

Figure 9B:
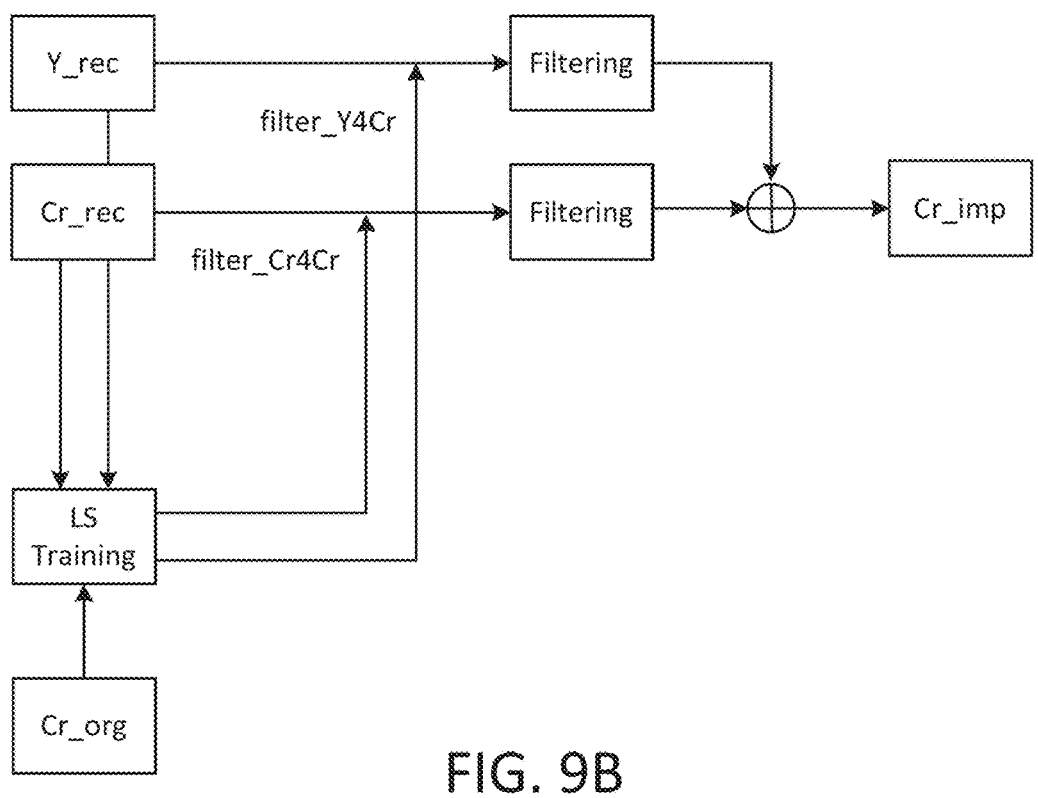

As shown in FIG. 9B, the quality of a Cr plane may be improved by employing the Y and Cr planes, but not the Cb plane, in LS training, such that two filters, filter_Y4Cr and filter_Cr4Cr, may be jointly derived and may be applied to Y and Cr, respectively. Respective outputs of the filters may be added together, for example to obtain an improved Cr plane, denoted Cr_imp.

The cross-plane filtering techniques illustrated in FIGS. 9A and 9B may reduce respective computational complexities of training and/or filtering, and/or may reduce overhead bits transmitting the cross-plane filter coefficients to the decoder side, such that performance degradation may be marginal.

In order to implement cross-plane filtering in a video coding system, one or more of the following may be addressed: cross-plane filter size determination; cross-plane filter coefficient quantization and/or transmission (e.g., signaling); or adapting cross-plane filtering to one or more local areas.

In order to train optimal cross-plane filters, suitable filter sizes may be determined. The size of a filter may be roughly proportional to the size of overhead associated with the filter and/or a computational complexity of the filter. For example, a 3×3 filter may have nine filter coefficients to be transmitted, and may employ nine multiplications and eight additions to accomplish filtering one pixel. A 5×5 filter may have twenty five filter coefficients to be transmitted and may employ twenty five multiplication and twenty four additions to filter one pixel. Larger size filters may achieve lower minimum distortion (e.g., as in equations (2) and (3)) and/or may provide better performance. Filter size may be selected in order balance of computational complexity, overhead size, and/or performance, for example.

Trained filters that may be applied to a plane itself, such as filter_Cb4Cb and filter_Cr4Cr, may be implemented as low-pass filters. Trained filters that may be used for cross-planes, such as filter_Y4Cb, filter_Y4Cr, filter_Cb4Cr, and filter_Cr4Cb, may be implemented as high-pass filters. Using different filters of differing sizes may have little influence on the performance of a corresponding video coding system. The size of a cross-plane filter may be kept small (e.g., as small as possible), for example such that performance penalties are negligible. For example, cross-plane filter size may be selected such that substantially no performance loss is observed. Large size cross-plane filters may be implemented (e.g., M×N cross-plane filters, where M and N may be integers).

For example, for low-pass filters, such as filter_Cb4Cb and filter_Cr4Cr, the filter size may be implemented as 1×1, such that the filter has one coefficient multiplied to respective pixels to be filtered. The filter coefficient of the 1×1 filter_Cb4Cb and filter_Cr4Cr may be fixed to be 1.0, such that the filter_Cb4Cb and filter_Cr4Cr may be saved (e.g., not applied and/or not signaled).

Figure 10C:
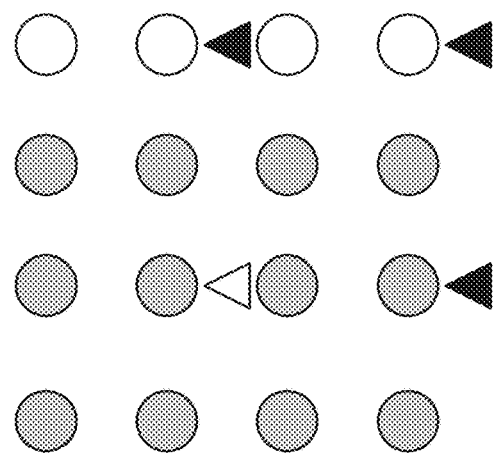
FIG. 10C depicts an example size and support region of a cross-plane filter (filter_Y4Cb and filter_Y4Cr) for a select chroma pixel in 4:2:0.
Figure 10B:
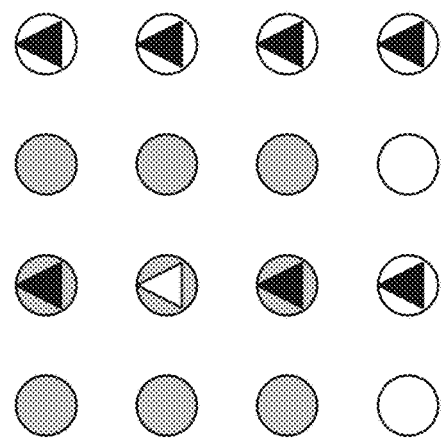
FIG. 10B depicts an example size and support region of a cross-plane filter (filter_Y4Cb and filter_Y4Cr) for a select chroma pixel in 4:2:2.
Figure 10A:
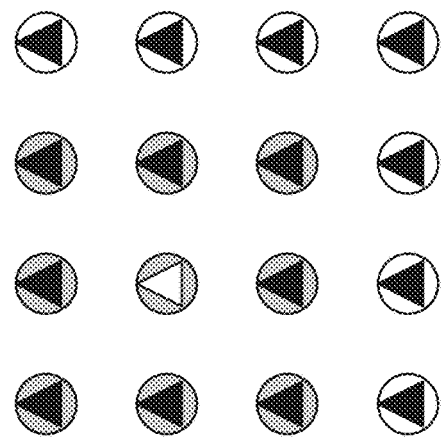
FIG. 10A depicts an example size and support region of a cross-plane filter (filter_Y4Cb and filter_Y4Cr) for a select chroma pixel in 4:4:4.
Figure 11C:
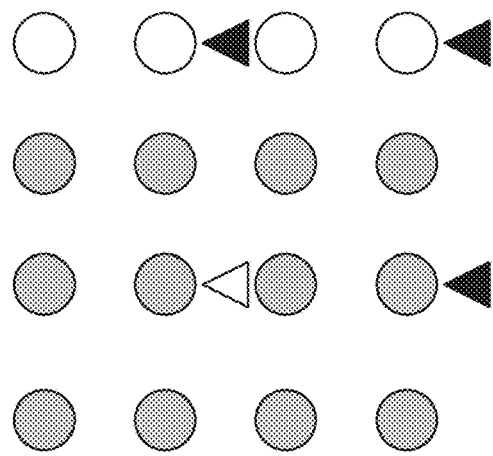
FIG. 11C depicts an example unified size and support region of a cross-plane filter (filter_Y4Cb and filter_Y4Cr) for a select chroma pixel in 4:2:0.
Figure 11B:
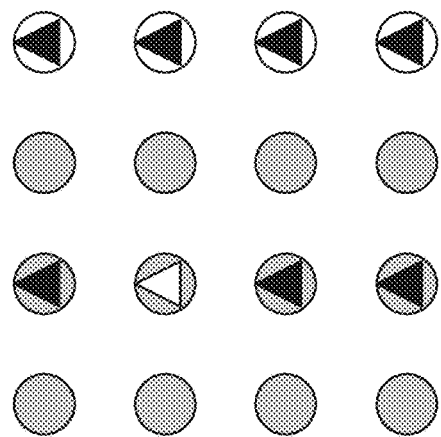
FIG. 11B depicts an example unified size and support region of a cross-plane filter (filter_Y4Cb and filter_Y4Cr) for a select chroma pixel in 4:2:2.
Figure 11A:
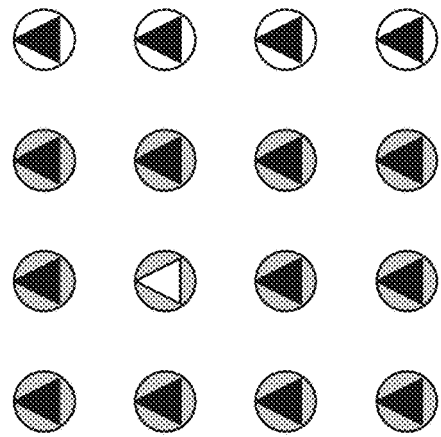
FIG. 11A depicts an example unified size and support region of a cross-plane filter (filter_Y4Cb and filter_Y4Cr) for a select chroma pixel in 4:4:4.

For high-pass filters, such as filter_Y4Cb and filter_Y4Cr, the filter size may be dependent on or independent of the color sampling format. Cross-plane filter size may depend on the color sampling format. For example, a size and/or support region of a cross-plane filter (e.g., filter_Y4Cb and filter_Y4Cr) may be implemented for a select chroma pixel, for example as illustrated in FIGS. 10A-10C, where circles may represent respective positions of luma samples, solid triangles may represent respective positions of chroma samples, and luma samples used to filter a select chroma sample (e.g., as represented by an outline triangle) may be represented by grayed circles. As illustrated, the filter size of filter_Y4Cb and filter_Y4Cr may be 3×3 for 4:4:4 and 4:2:2 color formats, and may be 4×3 for 4:2:0 color format. The filter size may be independent of the color format, for example as depicted in FIGS. 11A-11C. The filter size may be 4×3, for example in accordance with the size for 4:2:0 format.

A cross-plane filtering process may apply a trained high-pass filter on a Y plane and may take the filtering result, denoted Y_offset4Cb and Y_offset4Cr, as an offset that may be added to a corresponding pixel in a chroma plane, for example in accordance with equations (4) and (5).

$$Y\_offset4Cb = Y\_rec \otimes filter\_Y4Cb \text{ and}$$
$$Y\_offset4Cr = Y\_rec \otimes filter\_Y4Cr$$

$$Cb\_imp = Cb\_rec + Y\_offset4Cb \text{ and } Cr\_imp = Cr\_rec + Y\_offset4Cr \quad (4)$$

Cross-plane filter coefficients may be quantized. Trained cross-plane filters may have real-value coefficients that may be quantized, for example before transmission. For example, filter_Y4Cb may be roughly approximated by an integer filter, denoted as filter_int. Elements in filter_int may have small dynamic range (e.g., from −8 to 7 in accordance with a 4-bit representation). A second coefficient, denoted as coeff., may be used in order to make filter_int approach filter_Y4Cb more accurately, for example in accordance with equation (6).

$$filter\_Y4Cb \approx filter\_int \times coeff. \quad (6)$$

In equation (6), coeff., a real-valued number, may be approximated by $M/2^N$, where M and N are integers, for example in accordance with equation (7).

$$filter\_Y4Cb \approx filter\_int \times M/2^N \quad (7)$$

To transmit filter_Y4Cb, the coefficients in filter_int, together with M and N, may be coded in the bitstream, for example. The above-described quantization technique may be extended, for example, in order to quantize filter_Y4Cr.

Cross-plane filters (e.g., the filter_Y4Cb and/or the filter_Y4Cr) may have flexible separability and/or symmetries. Cross-plane filter properties introduced herein may be described in relation to an example 4×3 cross-plane filter (e.g., in accordance with FIG. 10A-10C or 11A-11C), but may be applicable to other filter sizes.

Cross-plane filters may have various symmetry properties, for example as depicted in FIGS. 12A-12E. A cross-plane filter may have no symmetry, for example as depicted in FIG. 12A. Each square may represent one filter coefficient, and may be labeled with a unique index, which may indicate that its value may be different from those of the remaining filter coefficients. A cross-plane filter may have horizontal and vertical symmetry, for example as depicted in FIG. 12B, such that a coefficient may have the same value as one or more corresponding coefficients in one or more other quadrants. A cross plane filter may have vertical symmetry, for example as depicted in FIG. 12C. A cross plane filter may have horizontal symmetry, for example as depicted in FIG. 12D. A cross plane filter may have point symmetry, for example as depicted in FIG. 12E.

Cross-plane filters are not limited to the symmetries illustrated in FIGS. 12A-12E, and may have one or more other symmetries. A cross plane filter may have a symmetry if at least two coefficients in a filter have the same value (e.g., at least two coefficients may be labeled with the same index). For example, for high pass cross-plane filters (e.g., filter_Y4Cb and filter_Y4Cr), it may be beneficial to enforce no symmetry on one or more (e.g., all) coefficients along the boundaries of the filter support region, but enforce some symmetry (e.g., horizontal and vertical, horizontal, vertical, or point symmetry) on one or more (e.g., all) of the inner coefficients of the filter support region.

A cross-plane filter may be separable. For example cross-plane filtering using a 4×3 two dimensional filter may be equivalent to applying a 1×3 horizontal filter to the lines (e.g., during the first stage) and applying a 4×1 vertical filter to the columns of the output of the first stage (e.g., during the second stage). The order of the first and second stages may be changed. Symmetry may be applied to the 1×3 horizontal filter and/or the 4×1 vertical filter. FIGS. 13A and 13B depict two one dimensional filters without and with symmetry, respectively.

Whether or not the cross-plane filter is separable and/or symmetric, the coding of filter coefficients into the bitstream may be limited to filter coefficients having unique values. For example, in accordance with the cross-plane filter depicted in FIG. 12A, twelve filter coefficients (indexed with 0 to 11) may be coded. In accordance with the cross-plane filter depicted in FIG. 12B, four filter coefficients (indexed with 0 to 3) may be coded. Implementing symmetry in a cross-plane filter may reduce overhead size (e.g., in a video signal bitstream).

A summation of the filter coefficients of a cross-plane filter may equal to zero, for example if the cross-plane filters (e.g., filter_Y4Cb and filter_Y4Cr) are high-pass filters. In accordance with this property, which may be a constraint, a coefficient (e.g., at least one coefficient) in a cross-plane filter may have a magnitude equal to the summation of the other coefficients but may have the opposite sign. If a cross-plane filter has X coefficients to be transmitted (e.g., with X equal to 12 as depicted in FIG. 12A), X−1 coefficients may be coded into the bitstream (e.g., explicitly coded). A decoder may receive the X−1 coefficients and may derive (e.g., implicitly derive) the value of the remaining coefficient, for example based on the zero-summation constraint.

Cross-plane filtering coefficients may be signaled, for example in a video bitstream. The example syntax table of FIG. 14 illustrates an example of signaling a set of two dimensional, non-separable, asymmetric cross-plane filter coefficients for a chroma plane (e.g., Cb or Cr). The following may apply to entries in the example syntax table. The entry num_coeff_hori_minus1 plus one (+1) may indicate a number of coefficients in a horizontal direction of the cross-plane filter. The entry num_coeff_vert_minus1 plus one (+1) may indicate a number of coefficients in a vertical direction of the cross-plane filter. The entry num_coeff_reduced_flag equal to 0 may indicate that a number of the cross-plane filter coefficients may be equal to (num_coeff_hori_minus1+1)×(num_coeff_vert_minus1+1), for example as depicted in FIG. 15A. As shown in FIG. 15A, num_coeff_hori_minus1 is equal to 2 and num_coeff_vert_minus1 is equal to 3.

Figure 15B:
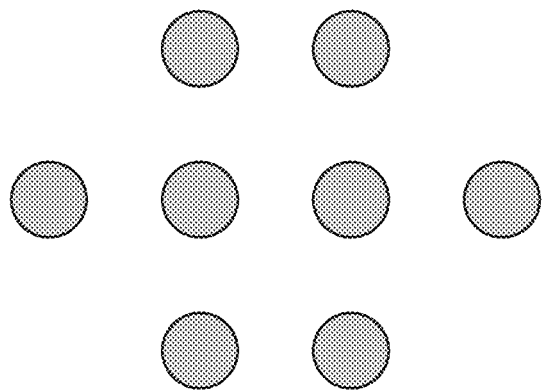
FIGS. 15A and 15B depict example arrangements of cross-plane filter coefficients.
Figure 15A:
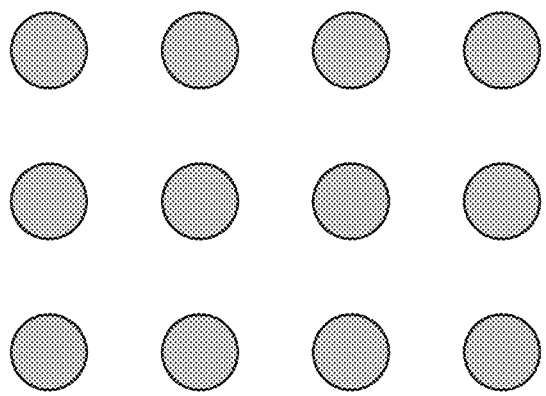

The entry num_coeff_reduced_flag equal to 1 may indicate that a number of cross-plane filter coefficients, which may typically be equal to (num_coeff_hori_minus1+1)×(num_coeff_vert_minus1+1), may be reduced to (num_coeff_hori_minus1+1)×(num_coeff_vert_minus1+1)−4, for example by removing the four corner coefficients, for instance as depicted in FIG. 15B. The support region of a cross-plane filter may be reduced, for example, by removing the four corner coefficients. Employing the num_coeff_reduced_flag entry may provide enhanced flexibility, for example in whether or not filter coefficients are reduced.

The entry filter_coeff_plus8 [i] minus 8 may correspond to an ith cross-plane filter coefficient. The value of filter coefficients may be in a range, for example, of −8 to 7. In such a case, the entry filter_coeff_plus8 [i] may be in the range of 0 to 15, and may be coded, for example, in accordance with 4-bit fixed-length coding (FLC). The entries scaling_factor_abs_minus1 and scaling_factor_sign may together specify a value of a scaling factor (e.g., M in equation (7)) as follows:

$$M=(1-2*scaling\_factor\_sign)*(scaling\_factor\_abs\_minus1+1)$$

The entry bit_shifting may specify a number of bits to be right shifted after a scaling process. This entry may represent N in equation (7).

Different regions of a picture may have different statistical properties. Deriving cross-plane filter coefficients for one or more such regions (e.g., for each such region) may improve chroma coding performance. To illustrate, different sets of cross-plane filer coefficients may be applied to different regions of a picture or a slice, for which multiple sets of cross-plane filter coefficients may be transmitted at the picture level (e.g., in an adaptive picture set (APS)) and/or at the slice level (e.g., in a slice header).

If cross-plane filtering is used in a post-processing implementation, for example applied to a reconstructed video before the video is displayed, one or more sets of filter coefficients may be transmitted as a supplemental enhancement information (SEI) message. For each color plane, a total number of filter sets may be signaled. If the number is greater than zero, one or more sets of cross-plane filter coefficients may be transmitted, for example sequentially.

The example syntax table of FIG. 16 illustrates an example of signaling multiple sets of cross-plane filter coefficients in an SEI message that may be named cross_plane_filter( ). The following may apply to entries in the example syntax table. The entry cross_plane_filter_enabled_flag equal to one (1) may specify that cross-plane filtering is enabled. In contrast, the entry cross_plane_filter_enabled_flag equal to zero (0) may specify that cross-plane filtering is disabled.

The entry cb_num_of_filter_sets may specify a number of cross-plane filter coefficients sets that may be used for coding the Cb plane of a current picture. The entry cb_num_of_filter_sets equal to zero (0) may indicate that cross-plane filtering is not applied on the Cb plane of the current picture. The entry cb_filter_coeff [i] may be the ith set of cross-plane filter coefficients for the Cb plane. The entry cb_filter_coeff may be a data construct, and may include one or more of num_coeff_hori_minus1, num_coeff_vert_minus1, num_coeff_reduced_flag, filter_coeff_plus8, scaling_factor_abs_minus1, scaling_factor_sign, or bit_shifting.

The entry cr_num_of_filter_sets may specify a number of cross-plane filter coefficients sets that may be used for coding the Cr plane of a current picture. The entry cr_num_of_filter_sets equal to zero (0) may indicate that cross-plane filtering is not applied on the Cr plane of the current picture. The entry cr_filter_coeff [i] may be the ith set of cross-plane filter coefficients for Cr plane. The entry cr_filter_coeff may be a data construct, and may include one or more of num_coeff_hori_minus1, num_coeff_vert_minus1, num_coeff_reduced_flag, filter_coeff_plus8, scaling_factor_abs_minus1, scaling_factor_sign, or bit_shifting.

Region-based cross-plane filtering may be implemented. Cross-plane filtering may be adapted for filtering one or more local areas in a video image, for instance if it is desired to recover a loss of high frequency information in associated chroma planes (e.g., with guidance of the luma plane). For example, cross-plane filtering may be applied to an area rich in edges and/or textures. Edge detection may be performed first, for example in order to find one or more regions where cross-plane filter may be applied. A high-pass filter, such as filter_Y4Cb and/or filter_Y4Cr, may first be applied to the Y plane.

A magnitude of a filtering result may imply whether a filtered pixel is in a high frequency area. A large magnitude may indicate sharp edges in a region of the filtered pixel. A magnitude close to zero may indicate that the filtered pixel is in a homogeneous region. A threshold may be employed to measure a filtering output by filter_Y4Cb and/or filter_Y4Cr. The filtering output may be added to a corresponding pixel in the chroma plane, for example if it is greater than the threshold. For example, respective chroma pixels in smooth regions may not be changed, which may avoid random filtering noise. Region-based cross-plane filtering may reduce video coding complexity while maintaining coding performance. For example, region information, which may include one or more regions, may be signaled to a decoder.

In an implementation of region-based cross-plane filtering, one or more regions with different statistical properties (e.g., smooth, colorful, texture, and/or edge-rich areas) may be detected, for example on the encoder side. A plurality of cross-plane filters may be derived and applied to corresponding ones of the one or more regions. Information pertaining to respective ones of the one or more regions may be transmitted to the decoder side. Such information may include, for example, the area of the region, the location of the region, and/or a specific cross-plane filter to apply to the region.

Figure 18:
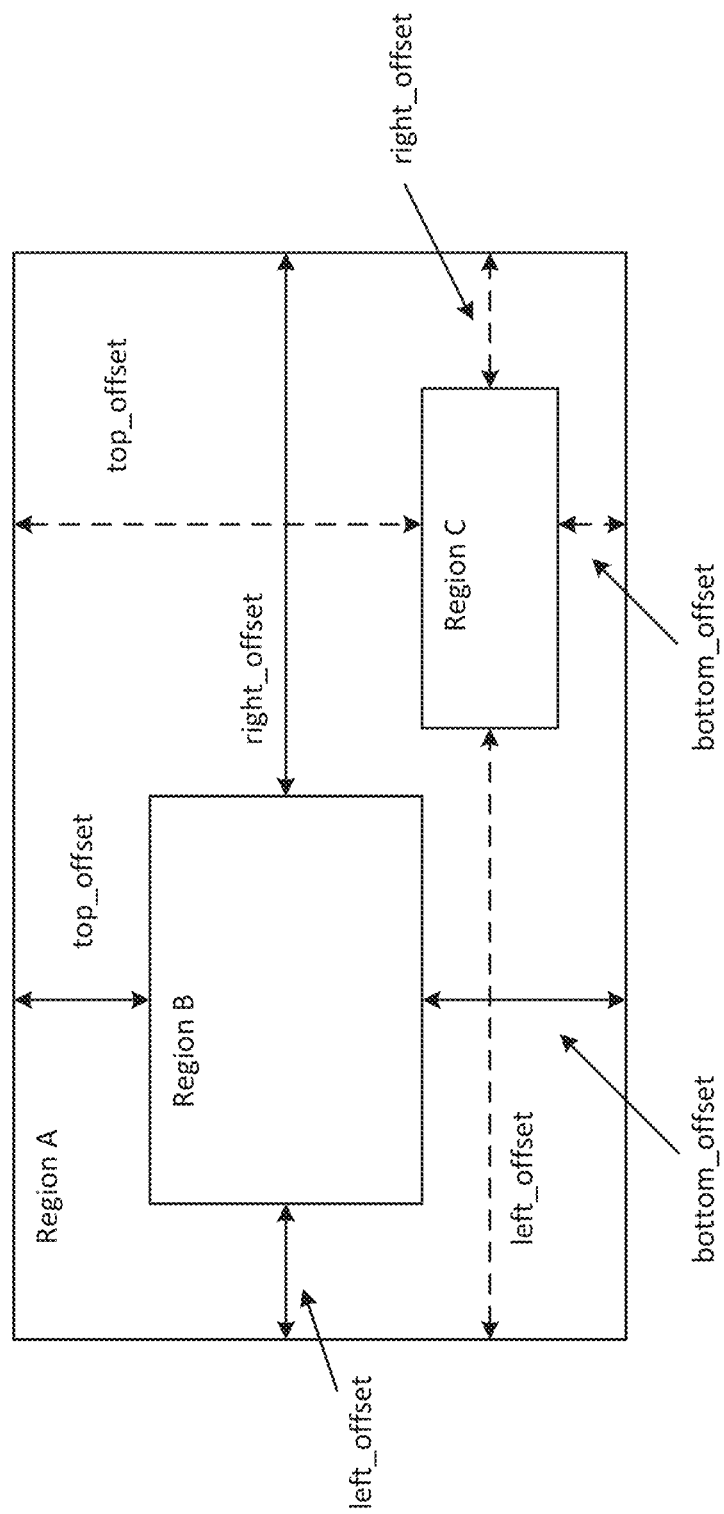
FIG. 18 depicts an example of a plurality of image regions detected in accordance with an implementation of region-based cross-plane filtering.

The example syntax table of FIG. 17 illustrates an example of signaling information pertaining to a particular region. The following may apply to entries in the example syntax table. The entries top_offset, left_offset, right_offset, and bottom_offset may specify an area and/or location of a current region. The entries may be representative of respective distances, for example in terms of pixels, from the top, left, right, and bottom sides of a current region to the corresponding four sides of an associated picture, for example as depicted in FIG. 18.

The cross_plane_filtering_region_info ( ) may include information pertaining to cross-plane filtering of a specified region of a Cb plane, cross-plane filtering of a specified region of a Cr plane, or to cross-plane filtering of respective specified regions of a Cb plane and a Cr plane.

The entry cb_filtering_enabled_flag equal to one (1) may indicate that cross-plane filtering for a current region of the Cb plane is enabled. The entry cb_filtering_enabled_flag equal to zero (0) may indicate that cross-plane filtering for the current region of the Cb plane is disabled. The entry cb_filter_idx may specify that the cross-plane filter cb_filter_coeff [cb_filter_idx] (e.g., signaling cb_filter_coeff as depicted in FIG. 16) may be applied to the current region of the Cb plane.

The entry cr_filtering_enabled_flag equal to one (1) may indicate that cross-plane filtering for a current region of the Cr plane is enabled. The entry cr_filtering_enabled_flag equal to zero (0) may indicate that cross-plane filtering for the current region of the Cr plane is disabled. The entry cr_filter_idx may specify that the cross-plane filter cr_filter_coeff [cr_filter_idx] (e.g., signaling cr_filter_coeff as depicted in FIG. 16) may be applied to the current region of the Cr plane.

Information pertaining to one or more regions may be transmitted at the picture level (e.g., in an APS or an SEI message) or at the slice level (e.g., in a slice header). The example syntax table of FIG. 19 illustrates an example of signaling multiple regions together with multiple cross-plane filters in an SEI message that may be named cross_plane_filter( ). Information pertaining to regions is italicized.

The following may apply to entries in the example syntax table. The entry cb_num_of_regions_minus1 plus 1(+1) may specify a number of regions in the Cb plane. Each region may be filtered by a corresponding cross-plane filter. The entry cb_num_of_regions_minus1 equal to zero (0) may indicate that an entirety of the Cb plane may be filtered by one cross-plane filter. The entry cb_region_info [i] may be the ith region information in the Cb plane. The entry cb_region_info may be a data construct, and may include one or more of top_offset, left_offset, right_offset, bottom_offset, cb_filtering_enabled_flag, or cb_filter_idx.

The entry cr_num_of_regions_minus1 plus 1 (+1) may specify a number of regions in the Cr plane. Each region may be filtered by a corresponding cross-plane filter. The entry cr_num_of_regions_minus1 equal to zero (0) may indicate that an entirety of the Cr plane may be filtered by one cross-plane filter. The entry cr_region_info [i] may be the ith region information in the Cr plane. The entry cr_region_info may be a data construct, and may include one or more of top_offset, left_offset, right_offset, bottom_offset, cr_filtering_enabled_flag, or cr_filter_idx.

Cross-plane filtering may be used in single-layer video coding systems, and/or in multi-layer video coding systems. In accordance with single-layer video coding (e.g., as illustrated in FIGS. 1 and 2), cross-plane filtering may be applied, for example to improve reference pictures (e.g., pictures stored in reference picture stores 164 and/or 264), such that one or more subsequent frames may be better predicted (e.g., with regard to the chroma planes).

Cross-plane filtering may be used as a post-processing method. For example, cross-plane filtering may be applied to a reconstructed output video 220 (e.g., before it is displayed). Although such filtering may not be a part of an MCP loop, and thus may not influence coding of subsequent pictures, the post-processing may improve (e.g., directly) quality of a video for display. For example, cross-plane filtering may be applied in HEVC postprocessing with supplemental enhancement information (SEI) signaling. Cross-plane filter information estimated at an encoder side may be delivered, for example, in an SEI message.

In accordance with an example of using multi-layer video coding (e.g., as illustrated in FIGS. 3 and 4), cross-plane filtering may be applied to one or more upsampled BL pictures, for example before the one or more pictures are placed in the EL DPB buffer (e.g., a reference picture list) for predicting higher layer pictures. As depicted in FIG. 5, cross-plane filtering may be performed in the third stage. To improve the quality of one or both chroma planes in an upsampled base layer reconstruction picture (e.g., an ILP picture), a corresponding luma plane involved in training and/or filtering may be one from the same ILP picture, where the training and/or filtering processes may be the same as used in single-layer video coding.

In accordance with another example of using multi-layer video coding, a corresponding luma plane may be used (e.g., directly) in the base layer reconstruction picture, without upsampling, to support cross-plane training and/or filtering, for example to enhance the chroma planes in the ILP picture. For example, in accordance with a 2× spatial SVC with a 4:2:0 video source, the size of a base layer luma plane may be substantially the same (e.g., exactly the same) as a size of one or both corresponding chroma planes in the ILP picture. The sampling grids of the two types of planes may be different. The luma plane in the base layer picture may be filtered by a phase-correction filter, for instance in order to align (e.g., exactly align) with a sampling grid of the chroma planes in the ILP picture. One or more following operations may be the same as those described elsewhere herein, for example for single-layer video coding. The color format may be considered as 4:4:4 (e.g., in accordance with FIG. 10A or FIG. 11A). Using the base layer luma plane to support cross-plane filtering for the chroma planes in an ILP picture may be extended to other ratios of spatial scalability and/or other color formats, for example by simple derivation.

In accordance with another example of using multi-layer video coding, cross-plane filtering may be applied to a reconstructed base layer picture that has not been upsampled. An output of the cross-plane filtering may be upsampled. As depicted in FIG. 5, cross-plane filtering may be performed in the first stage. In a spatial scalability case (e.g., where the BL has lower resolution than the EL), cross-plane filtering may be applied to fewer pixels, which may involve lower computational complexity than one or more of the other multi-layer video coding examples described herein. The equations (2) and (3) may not be directly applied, for example because, with reference to equation (2), $Y_{rec} \otimes filter_{Y4Cb} + Cb_{rec} \otimes filter_{Cb4Cb} + Cr_{rec} \otimes filter_{Cr4Cb}$ and $Cb_{org}$ may have different dimensions and may not subtract directly. $Y_{rec}$, $Cb_{rec}$, and $Cr_{rec}$ may have the same resolution as in a base layer picture. $Cb_{org}$ may have the same resolution as in an enhancement layer picture. The derivation of cross-plane filter coefficients in accordance with this example of multi-layer video coding may be achieved using equations (8) and (9)

$$(filter_{Y4Cb}, filter_{Cb4Cb}, filter_{Cr4Cb}) = \arg \min E[(U(Y_{rec} \otimes filter_{Y4Cb} + Cb_{rec} \otimes filter_{Cb4Cb} + Cr_{rec} \otimes filter_{Cr4Cb}) - Cb_{org})^2] \quad (8)$$

$$(filter_{Y4Cr}, filter_{Cb4Cr}, filter_{Cr4Cr}) = \arg \min E[(U(Y_{rec} \otimes filter_{Y4Cr} + Cb_{rec} \otimes filter_{Cb4Cr} + Cr_{rec} \otimes filter_{Cr4Cr}) - Cr_{org})^2] \quad (9)$$

where U may be an upsampling function that may take a base layer picture as an input, and may output an upsampled picture with the enhancement layer resolution.

In accordance with the cross-plane filtering technique illustrated in FIGS. 9A and 9B, a chroma plane may be enhanced by the luma plane and by itself (e.g., excluding the other chroma plane), and equations (8) and (9) may be simplified, for example as illustrated in equations (10) and (11).

$$(\text{filter}_{Y4Cb}, \text{filter}_{Cb4Cb}) = \arg\min E[(U(Y_{rec} \otimes \text{filter}_{Y4Cb} + Cb_{rec} \otimes \text{filter}_{Cb4Cb}) - Cb_{org})^2] \quad (10)$$

$$(\text{filter}_{Y4Cr}, \text{filter}_{Cb4Cr}) = \arg\min E[(U(Y_{rec} \otimes \text{filter}_{Y4Cr} + Cb_{rec} \otimes \text{filter}_{Cb4Cr}) - Cr_{org})^2] \quad (11)$$

Based on the cross-plane filtering technique illustrated in FIGS. 9A and 9B, the size of filter_Cb4Cb and/or filter_Cr4Cr may be reduced to 1×1 and the value of the filter coefficient may be set to 1.0. Equations (10) and (11) may be simplified, for example as illustrated in equations (12) and (13).

$$\text{filter}_{Y4Cb} = \arg\min E[(U(Y_{rec} \otimes \text{filter}_{Y4Cb} + Cb_{rec}) - Cb_{org})^2] \quad (12)$$

$$\text{filter}_{Y4Cr} = \arg\min E[(U(Y_{rec} \otimes \text{filter}_{Y4Cr} + Cb_{rec}) - Cr_{org})^2] \quad (13)$$

Cross-plane filtering may be adaptively applied. For example, when applied to multi-layer video coding, cross-plane filtering may be adaptively applied, for instance in the first and/or third stages as depicted in FIG. 5.

Cross-plane filtering may be adaptively applied to one or more coding levels, for example including one or more of a sequence-level, a picture-level, a slice-level, or a block-level. In accordance with sequence-level adaptation, for example, an encoder may determine to employ cross-plane filtering in the first stage and/or the third stage for coding a portion of a video sequence (e.g., the entirety of the video sequence). Such a determination may be represented, for example as a binary flag that may be included in a sequence header and/or in one or more sequence-level parameter sets, such as a video parameter set (VPS) and/or a sequence parameter set (SPS).

In accordance with picture-level adaptation, for example, an encoder may determine to employ cross-plane filtering in the first stage and/or the third stage for coding one or more EL pictures (e.g., each EL picture of a video sequence). Such a determination may be represented, for example as a binary flag that may be included in a picture header and/or in one or more picture-level parameter sets, such as an adaptive parameter set (APS) and/or a picture parameter set (PPS).

In accordance with slice-level adaptation, for example, an encoder may determine to employ cross-plane filtering in the first stage and/or the third stage for coding one or more EL video slices (e.g., each EL slice). Such a determination may be represented, for example as a binary flag that may be included in a slice header. Signaling mechanisms, such as the above-described, may be implemented in accordance with (e.g., extended to) one or more other level adaptations.

Picture-based cross-plane filtering may be implemented for multi-layer video coding, for example. Information related to such cross-plane filtering may be signaled. For example, one or more flags, such as uplane_filtering_flag and/or vplane_filtering_flag, may be coded, for example once per picture, and may be transmitted to a decoder. The flags uplane_filtering_flag and/or vplane_filtering_flag may indicate, for example, whether cross-plane filtering should be applied to the Cb plane and/or to the Cr plane, respectively. An encoder may determine whether to enable or disable cross-plane filtering for either chroma plane of one or more pictures (e.g., on a picture-by-picture basis). An encoder may be configured to make such a determination, for example, to improve coding performance and/or in accordance with desired levels of coding performance and complexity (e.g., turning on cross-plane filtering may increase decoding complexity).

An encoder may be configured to employ one or more techniques to determine whether to apply picture-based cross-plane filtering to one or more chroma planes. For example, in accordance with an example of performing picture-level selection, Cb planes before and after filtering, for example Cb_rec and Cb_imp, may be compared with an original Cb plane, for example Cb_org, in an EL picture. Mean square error (MSE) values before and after the filtering, that may be denoted as MSE_rec and MSE_imp, respectively, may be calculated and may be compared. In an example, MSE_imp may be smaller than MSE_rec, which may indicate that applying cross-plane filtering may reduce distortion, and cross-plane filtering may be enabled on the Cb plane. If MSE_imp is not smaller than MSE_rec, cross-plane filtering may be disabled on the Cb plane. In accordance with this technique, MSE may be calculated on a whole picture basis, which may mean that a single weighting factor may be applied to one or more pixels (e.g., each pixel) in the MSE calculation.

In accordance with another example of performing picture-level selection, MSE may be calculated based on one or more pixels involved in ILP, for example based on only those pixels involved in ILP. When the encoder determines whether to apply cross-plane filtering on the Cb plane, the ILP map for the picture may not be available yet. For example, the determination may be made before coding the EL picture, whereas the ILP map may be unavailable until the EL picture has been coded.

In accordance with another example of performing picture-level selection, a multi-pass encoding strategy may be employed. In a first pass, the EL picture may be encoded and the ILP map may be recorded. In a second pass, the determination of whether to use cross-plane filtering may be made, for example in accordance with an MSE calculation that may be limited to ILP blocks marked by the ILP map. The picture may be encoded in accordance with this determination. Such multi-pass encoding may be time-consuming, and may involve greater computational complexity when compared to single-pass encoding.

One or more moving objects in respective pictures (e.g., respective pictures of a video sequence) may be more likely to be coded by the ILP picture than non-moving objects. The ILP maps of successive pictures (e.g., successive pictures of a video sequence) may be correlated (e.g., may exhibit a high degree of correlation). Such successive ILP maps may exhibit one or more displacements (e.g., relatively small displacements) relative to each other. Such displacements may be attributed to respective different time instances of the pictures, for example.

In accordance with another example of performing picture-level selection, the ILP maps of one or more previously coded EL pictures may be used to predict an ILP map of a current EL picture to be coded. The predicted ILP map may be used to locate one or more blocks that may be likely to be used for ILP in coding the current EL picture. Such likely to be used blocks may be referred to as potential ILP blocks. One or more potential ILP blocks may be included in calculating the MSE (e.g., as described above) and/or may be used in determining whether to apply cross-plane filtering, for example based on the calculated MSE.

The dimension of the ILP map may depend, for example, on a granularity that an encoder selects. If the dimension of the picture is W×H (e.g., in terms of luma resolution), for example, the dimension of the ILP map may be W×H, in which an entry may represent whether a corresponding pixel is used for ILP. The dimension of the ILP map may be (W/M)×(H/N), in which an entry may represent whether a corresponding block of size M×N is used for ILP. In accordance with an example implementation, M=N=4 may be selected.

An accurate ILP map, for example recorded after the EL picture is coded, may be a binary map, such that entries (e.g., each entry) may be limited to one of two possible values (e.g., zero (0) or one (1)) that may indicate whether the entry is used for ILP. The values of 0 and 1 may indicate for example, that the entry is used for ILP or is not used for ILP, respectively.

The predicted ILP map may be a multi-level map. In accordance with such an ILP map, each entry may have multiple possible values that may represent multiple-level confidence in predicting the block to be used for ILP. Larger values may be indicative of higher confidence. In accordance with an example implementation, possible values of the predicted ILP map from 0 to 128 may be used, where 128 represents a highest confidence and 0 represents a lowest confidence.

Figure 20:
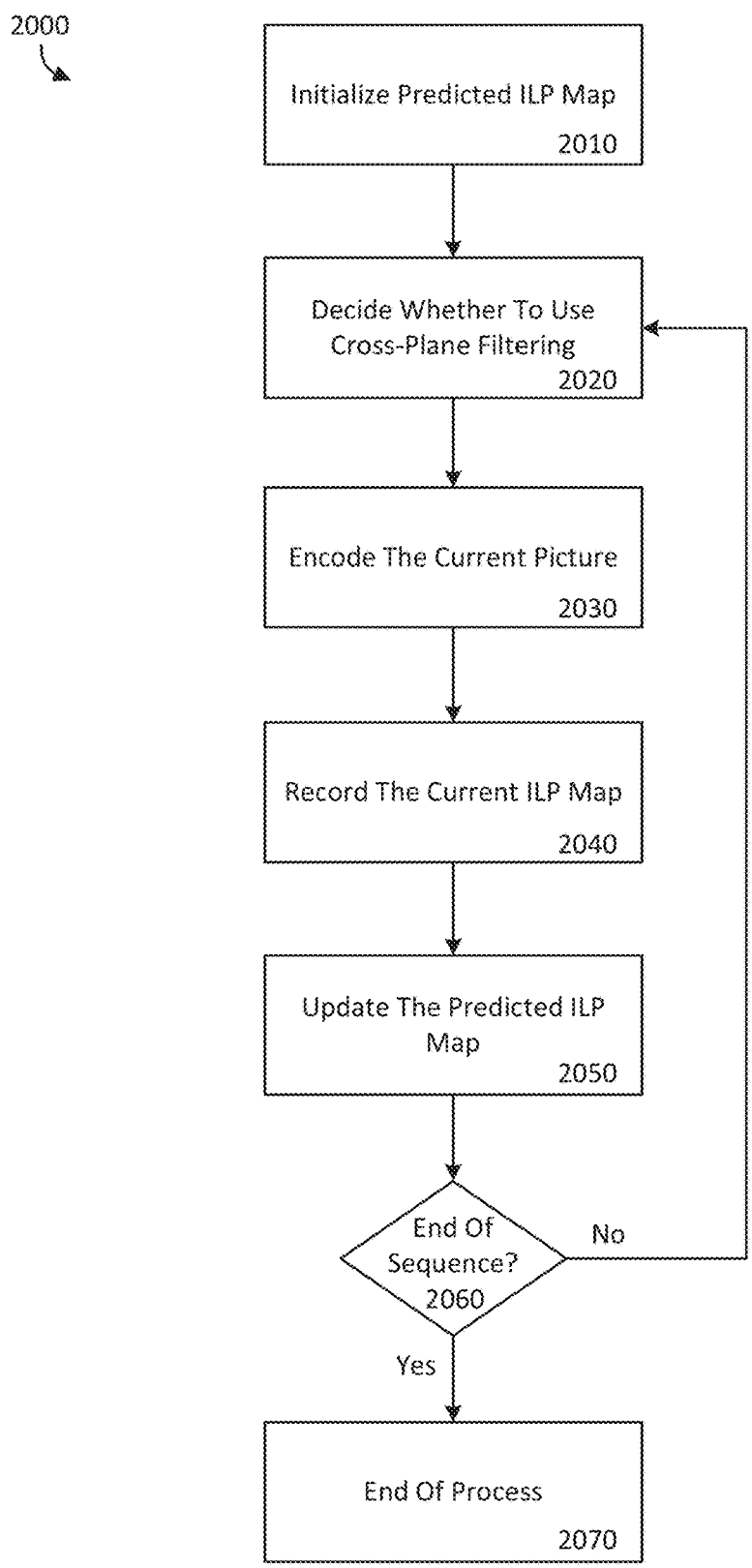
FIG. 20 depicts an example picture-level selection algorithm for cross-plane filtering.

FIG. 20 depicts an example picture-level selection algorithm 2000 for cross-plane filtering. The illustrated picture-level selection algorithm may be applied to, for example, the Cb plane and/or the Cr plane. At 2010, for example before encoding a first picture, a predicted ILP map, denoted as PredILPMap, may be initialized. In accordance with the depicted algorithm, it may be assumed that each block may have an equal chance to be used for ILP, and the value of each entry of the PredILPMap may be set to 128.

At 2020, the encoder may determine whether to apply cross-plane filtering. An enhanced Cb plane, Cb_imp, may be generated by cross-plane filtering. A weighted MSE may be calculated, using equations (14) and (15) for example.

$$Weighted_{MSE_{imp}} = \qquad (14)$$

$$\frac{4}{Width \times Height} \sum_{x=0}^{Width/2-1} \sum_{y=0}^{Height/2-1} PredILPMap\left(\frac{x}{4}, \frac{y}{4}\right)$$

$$\left(Cb_{imp}\left(\frac{x}{2}, \frac{y}{2}\right) - Cb_{org}\left(\frac{x}{2}, \frac{y}{2}\right)\right)^2$$

$$Weighted_{MSE_{rec}} = \qquad (15)$$

$$\frac{4}{Width \times Height} \sum_{x=0}^{Width/2-1} \sum_{y=0}^{Height/2-1} PredILPMap\left(\frac{x}{4}, \frac{y}{4}\right)$$

$$\left(Cb_{rec}\left(\frac{x}{2}, \frac{y}{2}\right) - Cb_{org}\left(\frac{x}{2}, \frac{y}{2}\right)\right)^2$$

In equations (14) and (15), Cb_rec and Cb_imp may represent the Cb plane before and after cross-plane filtering, Cb_org may represent an original Cb plane of the current EL picture to be coded, and (x, y) may represent a position of a certain pixel in the grid of the luma plane. As shown, equations (14) and (15) assume 4:2:0 color subsampling and that an entry of the ILP map represents a 4×4 block size, so the corresponding positions in the Cb plane and PredILPMap may be (x/2, y/2) and (x/4, y/4), respectively. For each pixel, the squared error $(Cb\_imp(x/2,y/2)-Cb\_org(x/2,y/2))^2$ or $(Cb\_rec(x/2,y/2)-Cb\_org(x/2,y/2))^2$ may be weighted by a corresponding factor in PredILPMap, for example before the error is accumulated into Weighted_MSE_imp or Weighted_MSE_rec. This may mean that distortion on one or more pixels that are more likely to be used for ILP may have higher weight in the weighted MSE.

Alternatively or additionally at 2020, an enhanced Cr plane, Cr_imp, may be generated by cross-plane filtering. A weighted MSE may be calculated, using equations (16) and (17) for example.

$$Weighted_{MSE_{imp}} = \qquad (16)$$

$$\frac{4}{Width \times Height} \sum_{x=0}^{Width/2-1} \sum_{y=0}^{Height/2-1} PredILPMap\left(\frac{x}{4}, \frac{y}{4}\right)$$

$$\left(Cr_{imp}\left(\frac{x}{2}, \frac{y}{2}\right) - Cr_{org}\left(\frac{x}{2}, \frac{y}{2}\right)\right)^2$$

$$Weighted_{MSE_{rec}} = \qquad (17)$$

$$\frac{4}{Width \times Height} \sum_{x=0}^{Width/2-1} \sum_{y=0}^{Height/2-1} PredILPMap\left(\frac{x}{4}, \frac{y}{4}\right)$$

$$\left(Cr_{rec}\left(\frac{x}{2}, \frac{y}{2}\right) - Cr_{org}\left(\frac{x}{2}, \frac{y}{2}\right)\right)^2$$

In equations (16) and (17), Cr_rec and Cr_imp may represent the Cr plane before and after cross-plane filtering, Cr_org may represent an original Cr plane of the current EL picture to be coded, and (x, y) may represent a position of a certain pixel in the grid of the luma plane. As shown, equations (16) and (17) assume 4:2:0 color subsampling and that an entry of the ILP map represents a 4×4 block size, so the corresponding positions in the Cr plane and PredILPMap may be (x/2, y/2) and (x/4, y/4), respectively. For each pixel, the squared error $(Cr\_imp(x/2,y/2)-Cr\_org(x/2,y/2))^2$ or $(Cr\_rec(x/2,y/2)-Cr\_org(x/2,y/2))^2$ may be weighted by a corresponding factor in PredILPMap, for example before the error is accumulated into Weighted_MSE_imp or Weighted_MSE_rec. This may mean that distortion on one or more pixels that are more likely to be used for ILP may have higher weight in the weighted MSE.

Weighted_MSE_imp and Weighted_MSE_rec may be compared to one another. If Weighted_MSE_imp is smaller than Weighted_MSE_rec, which may indicate that cross-plane filtering may reduce distortion (e.g., distortion of one or more of the potential ILP blocks) cross-plane filtering may be enabled. If Weighted_MSE_imp is not smaller than Weighted_MSE_rec, cross-plane filtering may be disabled.

Once the determination is made at 2020, the current EL picture may be encoded at 2030, and the current ILP map, which may be denoted as CurrILPMap, may be recorded at 2040. The current ILP map may be used, for example, with an EL picture subsequent to the current EL picture. The current ILP map may be accurate, rather than predicted, and may be binary. If a corresponding block is used for ILP, the value of the entry for that block may be set to 128. If the corresponding block is not used for ILP the value of the entry for that block may be set to zero (0).

At 2050, the current ILP map may be used to update the predicted ILP map, for example as shown in equation (18). In accordance with an example updating process, a sum of the previously predicted ILP map (e.g., PredILPMap(x,y)) and the current ILP map (e.g., CurrILPMap(x,y)) may be divided by two, which may mean that an ILP map associated with another picture may have a relatively small impact on the updated predicted ILP map.

$$PredILPMap(x, y) = \qquad (18)$$
$$\frac{PredILPMap(x, y) + CurrILPMap(x, y)}{2} \quad 0 \le x < \frac{Width}{4},$$
$$0 \le y < \frac{Height}{4}$$

At 2060, it may be determined whether an end of the video sequence has been reached. If the end of the video sequence has not been reached, one or more of the above-described operations (e.g., 2020 to 2060) may be repeated, for example to code successive EL pictures. If the end of the video sequence has been reached, the example picture-level selection algorithm 2000 may terminate at 2070.

The herein described video coding techniques, for example employing cross-plane filtering, may be implemented in accordance with transporting video in a wireless communication system, such as the example wireless communication system 2100, and components thereof, depicted in FIGS. 21A-21E.

Figure 21A:
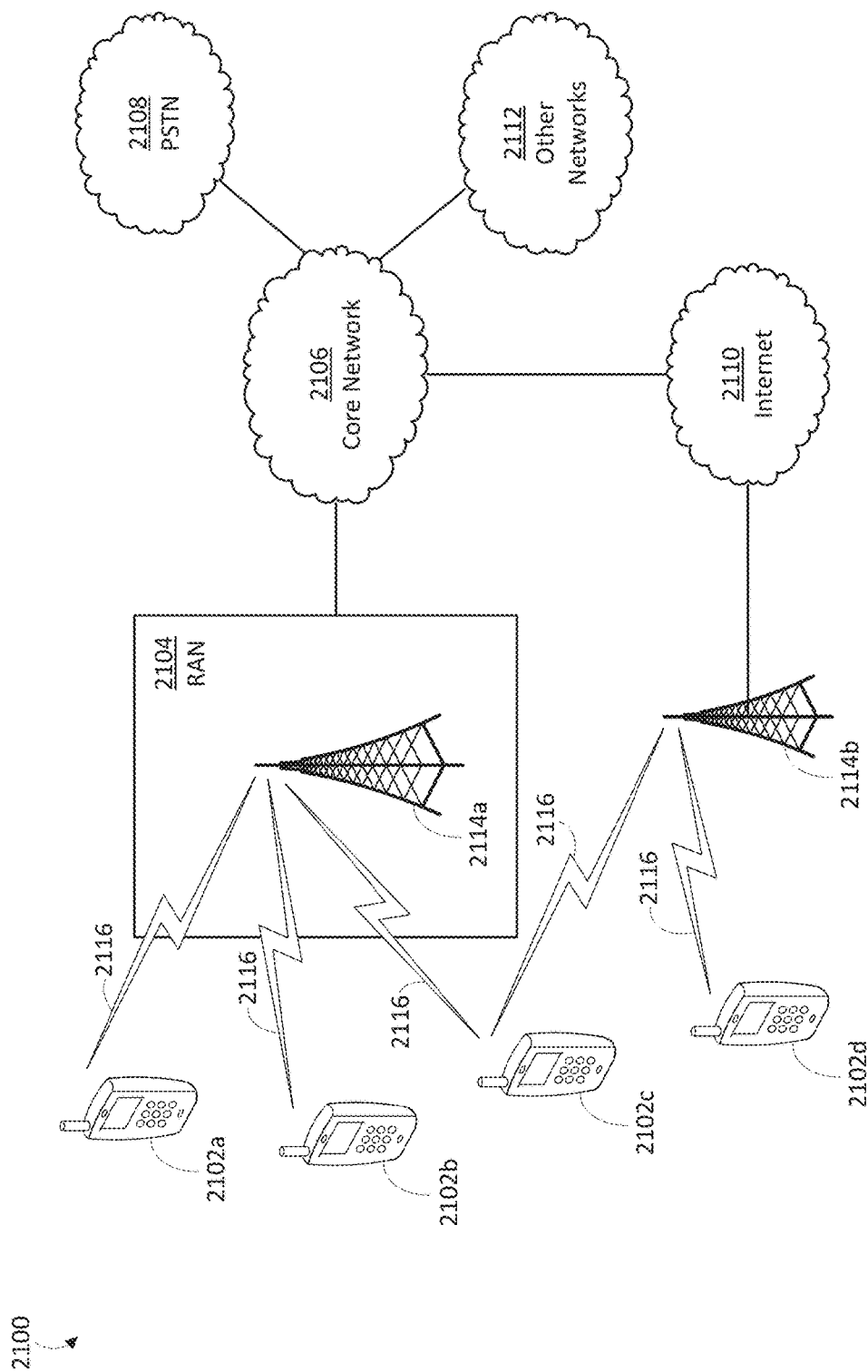
FIG. 21A depicts a system diagram of an example communications system in which one or more disclosed embodiments may be implemented.

FIG. 21A is a diagram of an example communications system 2100 in which one or more disclosed embodiments may be implemented. For example, a wireless network (e.g., a wireless network comprising one or more components of the communications system 2100) may be configured such that bearers that extend beyond the wireless network (e.g., beyond a walled garden associated with the wireless network) may be assigned QoS characteristics.

The communications system 2100 may be a multiple access system that provides content, such as voice, data, video, messaging, broadcast, etc., to multiple wireless users. The communications system 2100 may enable multiple wireless users to access such content through the sharing of system resources, including wireless bandwidth. For example, the communications systems 2100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 21A, the communications system 2100 may include at least one wireless transmit/receive unit (WTRU), such as a plurality of WTRUs, for instance WTRUs 2102a, 2102b, 2102c, and 2102d, a radio access network (RAN) 2104, a core network 2106, a public switched telephone network (PSTN) 2108, the Internet 2110, and other networks 2112, though it should be appreciated that the disclosed embodiments contemplate any number of WTRUs, base stations, networks, and/or network elements. Each of the WTRUs 2102a, 2102b, 2102c, 2102d may be any type of device configured to operate and/or communicate in a wireless environment. By way of example, the WTRUs 2102a, 2102b, 2102c, 2102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 2100 may also include a base station 2114a and a base station 2114b. Each of the base stations 2114a, 2114b may be any type of device configured to wirelessly interface with at least one of the WTRUs 2102a, 2102b, 2102c, 2102d to facilitate access to one or more communication networks, such as the core network 2106, the Internet 2110, and/or the networks 2112. By way of example, the base stations 2114a, 2114b may be a base transceiver station (BTS), a Node-B, an eNode B, a Home Node B, a Home eNode B, a site controller, an access point (AP), a wireless router, and the like. While the base stations 2114a, 2114b are each depicted as a single element, it should be appreciated that the base stations 2114a, 2114b may include any number of interconnected base stations and/or network elements.

The base station 2114a may be part of the RAN 2104, which may also include other base stations and/or network elements (not shown), such as a base station controller (BSC), a radio network controller (RNC), relay nodes, etc. The base station 2114a and/or the base station 2114b may be configured to transmit and/or receive wireless signals within a particular geographic region, which may be referred to as a cell (not shown). The cell may further be divided into cell sectors. For example, the cell associated with the base station 2114a may be divided into three sectors. Thus, in one embodiment, the base station 2114a may include three transceivers, i.e., one for each sector of the cell. In another embodiment, the base station 2114a may employ multiple-input multiple output (MIMO) technology and, therefore, may utilize multiple transceivers for each sector of the cell.

The base stations 2114a, 2114b may communicate with one or more of the WTRUs 2102a, 2102b, 2102c, 2102d over an air interface 2116, which may be any suitable wireless communication link (e.g., radio frequency (RF), microwave, infrared (IR), ultraviolet (UV), visible light, etc.). The air interface 2116 may be established using any suitable radio access technology (RAT).

More specifically, as noted above, the communications system 2100 may be a multiple access system and may employ one or more channel access schemes, such as CDMA, TDMA, FDMA, OFDMA, SC-FDMA, and the like. For example, the base station 2114a in the RAN 2104 and the WTRUs 2102a, 2102b, 2102c may implement a radio technology such as Universal Mobile Telecommunications System (UMTS) Terrestrial Radio Access (UTRA), which may establish the air interface 2116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 2114a and the WTRUs 2102a, 2102b, 2102c may implement a radio technology such as Evolved UMTS Terrestrial Radio Access (E-UTRA), which may establish the air interface 2116 using Long Term Evolution (LTE) and/or LTE-Advanced (LTE-A).

In other embodiments, the base station 2114a and the WTRUs 2102a, 2102b, 2102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 2114b in FIG. 21A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 2114b and the WTRUs 2102c, 2102d may implement a radio technology such as IEEE 802.11 to establish a wireless local area network (WLAN). In another embodiment, the base station 2114b and the WTRUs 2102c, 2102d may implement a radio technology such as IEEE 802.15 to establish a wireless personal area network (WPAN). In yet another embodiment, the base station 2114b and the WTRUs 2102c, 2102d may utilize a cellular-based RAT (e.g., WCDMA, CDMA2000, GSM, LTE, LTE-A, etc.) to establish a picocell or femtocell. As shown in FIG. 21A, the base station 2114b may have a direct connection to the Internet 2110. Thus, the base station 2114b may not be required to access the Internet 2110 via the core network 2106.

The RAN 2104 may be in communication with the core network 2106, which may be any type of network configured to provide voice, data, applications, and/or voice over internet protocol (VoIP) services to one or more of the WTRUs 2102a, 2102b, 2102c, 2102d. For example, the core network 2106 may provide call control, billing services, mobile location-based services, pre-paid calling, Internet connectivity, video distribution, etc., and/or perform high-level security functions, such as user authentication. Although not shown in FIG. 21A, it should be appreciated that the RAN 2104 and/or the core network 2106 may be in direct or indirect communication with other RANs that employ the same RAT as the RAN 2104 or a different RAT. For example, in addition to being connected to the RAN 2104, which may be utilizing an E-UTRA radio technology, the core network 2106 may also be in communication with another RAN (not shown) employing a GSM radio technology.

The core network 2106 may also serve as a gateway for the WTRUs 2102a, 2102b, 2102c, 2102d to access the PSTN 2108, the Internet 2110, and/or other networks 2112. The PSTN 2108 may include circuit-switched telephone networks that provide plain old telephone service (POTS). The Internet 2110 may include a global system of interconnected computer networks and devices that use common communication protocols, such as the transmission control protocol (TCP), user datagram protocol (UDP) and the internet protocol (IP) in the TCP/IP internet protocol suite. The networks 2112 may include wired or wireless communications networks owned and/or operated by other service providers. For example, the networks 2112 may include another core network connected to one or more RANs, which may employ the same RAT as the RAN 2104 or a different RAT.

Some or all of the WTRUs 2102a, 2102b, 2102c, 2102d in the communications system 2100 may include multi-mode capabilities, i.e., the WTRUs 2102a, 2102b, 2102c, 2102d may include multiple transceivers for communicating with different wireless networks over different wireless links. For example, the WTRU 2102c shown in FIG. 21A may be configured to communicate with the base station 2114a, which may employ a cellular-based radio technology, and with the base station 2114b, which may employ an IEEE 802 radio technology.

Figure 21B:
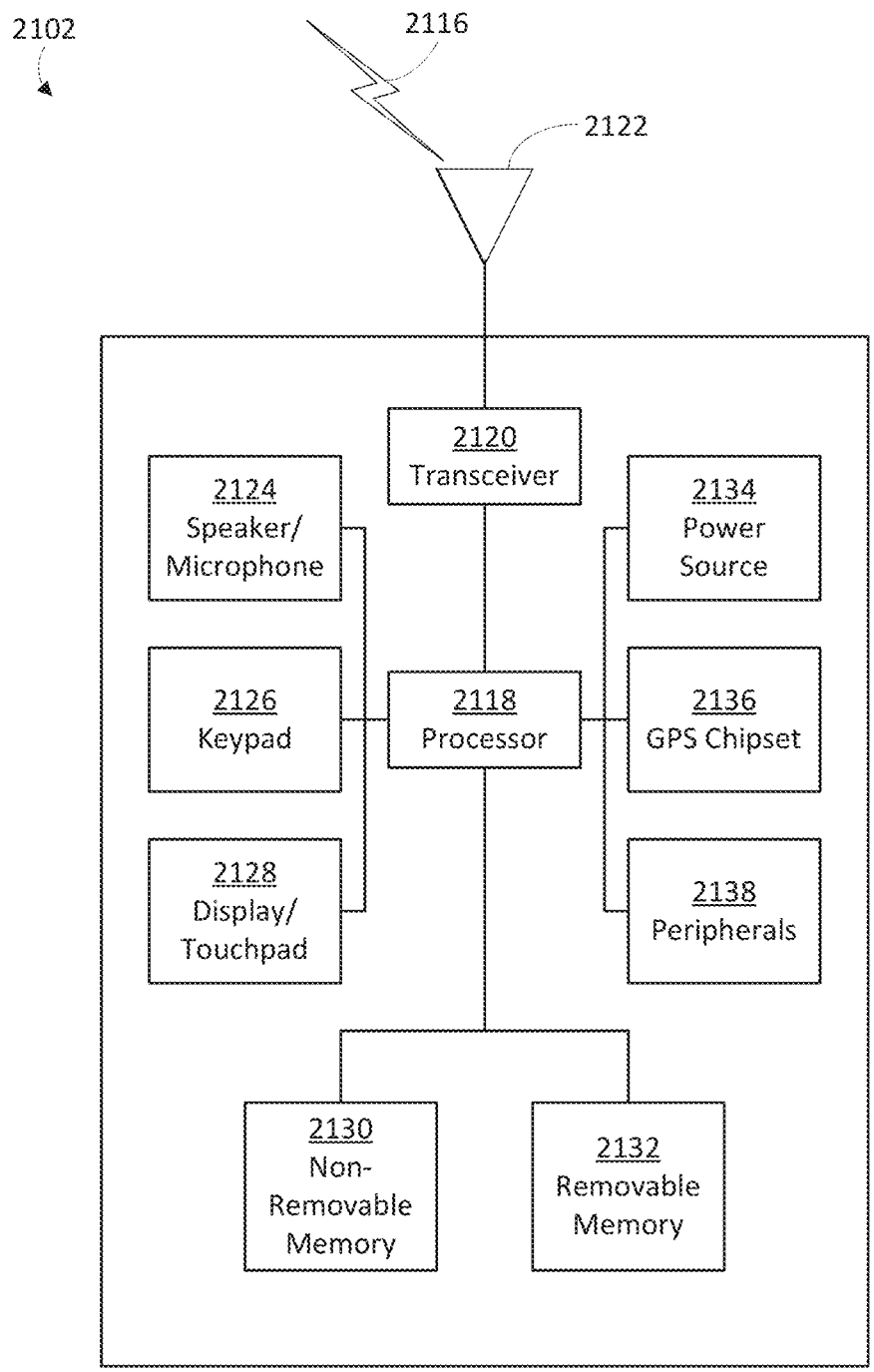
FIG. 21B depicts a system diagram of an example wireless transmit/receive unit (WTRU) that may be used within the communications system illustrated in FIG. 21A.

FIG. 21B is a system diagram of an example WTRU 2102. As shown in FIG. 21B, the WTRU 2102 may include a processor 2118, a transceiver 2120, a transmit/receive element 2122, a speaker/microphone 2124, a keypad 2126, a display/touchpad 2128, non-removable memory 2130, removable memory 2132, a power source 2134, a global positioning system (GPS) chipset 2136, and other peripherals 2138. It should be appreciated that the WTRU 2102 may include any sub-combination of the foregoing elements while remaining consistent with an embodiment.

The processor 2118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 2118 may perform signal coding, data processing, power control, input/output processing, and/or any other functionality that enables the WTRU 2102 to operate in a wireless environment. The processor 2118 may be coupled to the transceiver 2120, which may be coupled to the transmit/receive element 2122. While FIG. 21B depicts the processor 2118 and the transceiver 2120 as separate components, it should be appreciated that the processor 2118 and the transceiver 2120 may be integrated together in an electronic package or chip.

The transmit/receive element 2122 may be configured to transmit signals to, or receive signals from, a base station (e.g., the base station 2114a) over the air interface 2116. For example, in one embodiment, the transmit/receive element 2122 may be an antenna configured to transmit and/or receive RF signals. In another embodiment, the transmit/receive element 2122 may be an emitter/detector configured to transmit and/or receive IR, UV, or visible light signals, for example. In yet another embodiment, the transmit/receive element 2122 may be configured to transmit and receive both RF and light signals. It should be appreciated that the transmit/receive element 2122 may be configured to transmit and/or receive any combination of wireless signals.

In addition, although the transmit/receive element 2122 is depicted in FIG. 21B as a single element, the WTRU 2102 may include any number of transmit/receive elements 2122. More specifically, the WTRU 2102 may employ MIMO technology. Thus, in one embodiment, the WTRU 2102 may include two or more transmit/receive elements 2122 (e.g., multiple antennas) for transmitting and receiving wireless signals over the air interface 2116.

The transceiver 2120 may be configured to modulate the signals that are to be transmitted by the transmit/receive element 2122 and to demodulate the signals that are received by the transmit/receive element 2122. As noted above, the WTRU 2102 may have multi-mode capabilities. Thus, the transceiver 2120 may include multiple transceivers for enabling the WTRU 2102 to communicate via multiple RATs, such as UTRA and IEEE 802.11, for example.

The processor 2118 of the WTRU 2102 may be coupled to, and may receive user input data from, the speaker/microphone 2124, the keypad 2126, and/or the display/touchpad 2128 (e.g., a liquid crystal display (LCD) display unit or organic light-emitting diode (OLED) display unit). The processor 2118 may also output user data to the speaker/microphone 2124, the keypad 2126, and/or the display/touchpad 2128. In addition, the processor 2118 may access information from, and store data in, any type of suitable memory, such as the non-removable memory 2130 and/or the removable memory 2132. The non-removable memory 2130 may include random-access memory (RAM), read-only memory (ROM), a hard disk, or any other type of memory storage device. The removable memory 2132 may include a subscriber identity module (SIM) card, a memory stick, a secure digital (SD) memory card, and the like. In other embodiments, the processor 2118 may access information from, and store data in, memory that is not physically located on the WTRU 2102, such as on a server or a home computer (not shown).

The processor 2118 may receive power from the power source 2134, and may be configured to distribute and/or control the power to the other components in the WTRU 2102. The power source 2134 may be any suitable device for powering the WTRU 2102. For example, the power source 2134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 2118 may also be coupled to the GPS chipset 2136, which may be configured to provide location information (e.g., longitude and latitude) regarding the current location of the WTRU 2102. In addition to, or in lieu of, the information from the GPS chipset 2136, the WTRU 2102 may receive location information over the air interface 2116 from a base station (e.g., base stations 2114a, 2114b) and/or determine its location based on the timing of the signals being received from two or more nearby base stations. It should be appreciated that the WTRU 2102 may acquire location information by way of any suitable location-determination method while remaining consistent with an embodiment.

The processor 2118 may further be coupled to other peripherals 2138, which may include one or more software and/or hardware modules that provide additional features, functionality and/or wired or wireless connectivity. For example, the peripherals 2138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 21C:
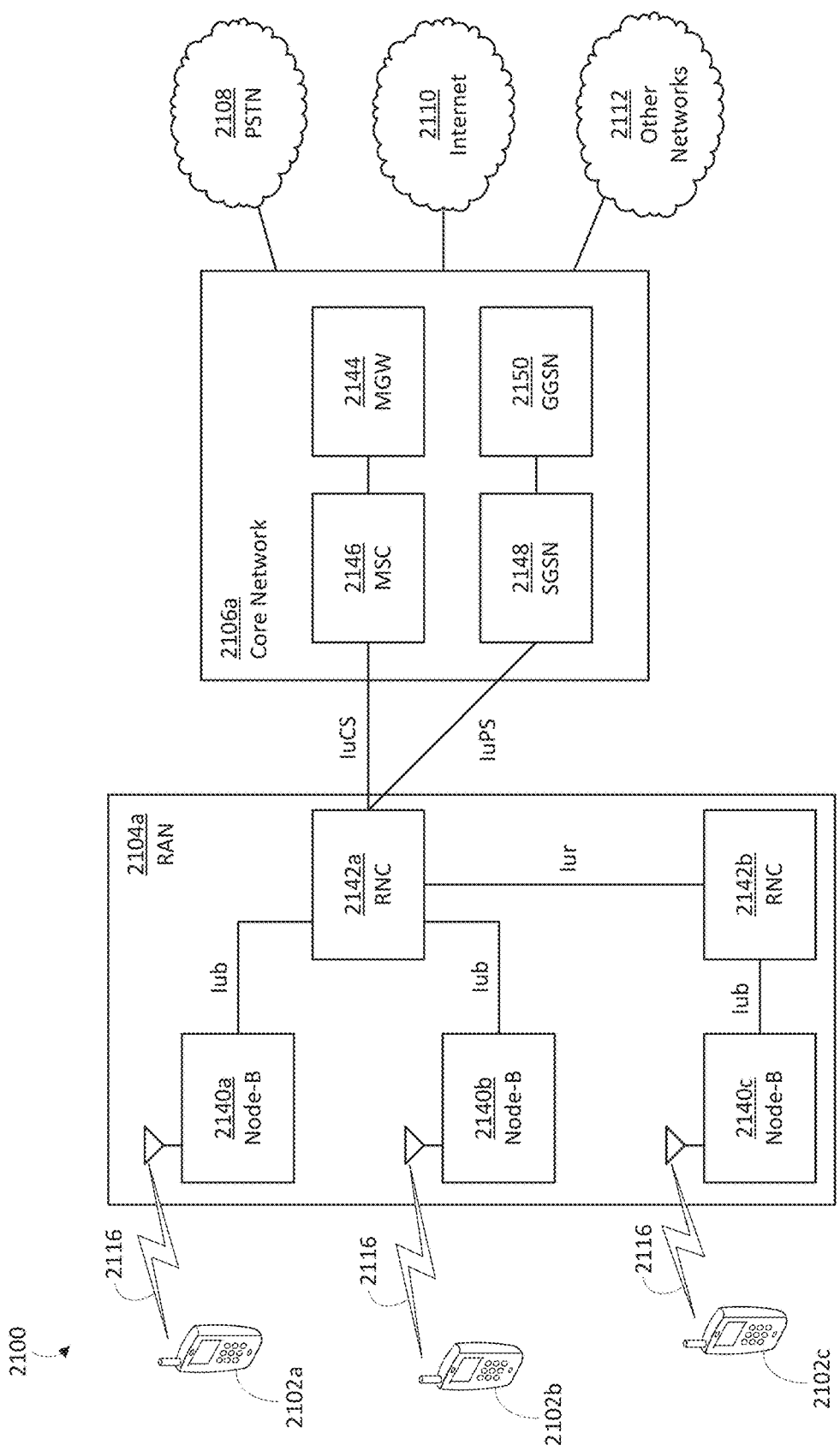
FIG. 21C depicts a system diagram of an example radio access network and an example core network that may be used within the communications system illustrated in FIG. 21A.

FIG. 21C is a system diagram of an embodiment of the communications system 2100 that includes a RAN 2104a and a core network 2106a that comprise example implementations of the RAN 2104 and the core network 2106, respectively. As noted above, the RAN 2104, for instance the RAN 2104a, may employ a UTRA radio technology to communicate with the WTRUs 2102a, 2102b, and 2102c over the air interface 2116. The RAN 2104a may also be in communication with the core network 2106a. As shown in FIG. 21C, the RAN 2104a may include Node-Bs 2140a, 2140b, 2140c, which may each include one or more transceivers for communicating with the WTRUs 2102a, 2102b, 2102c over the air interface 2116. The Node-Bs 2140a, 2140b, 2140c may each be associated with a particular cell (not shown) within the RAN 2104a. The RAN 2104a may also include RNCs 2142a, 2142b. It should be appreciated that the RAN 2104a may include any number of Node-Bs and RNCs while remaining consistent with an embodiment.

As shown in FIG. 21C, the Node-Bs 2140a, 2140b may be in communication with the RNC 2142a. Additionally, the Node-B 2140c may be in communication with the RNC 2142b. The Node-Bs 2140a, 2140b, 2140c may communicate with the respective RNCs 2142a, 2142b via an Iub interface. The RNCs 2142a, 2142b may be in communication with one another via an Iur interface. Each of the RNCs 2142a, 2142b may be configured to control the respective Node-Bs 2140a, 2140b, 2140c to which it is connected. In addition, each of the RNCs 2142a, 2142b may be configured to carry out or support other functionality, such as outer loop power control, load control, admission control, packet scheduling, handover control, macrodiversity, security functions, data encryption, and the like.

The core network 2106a shown in FIG. 21C may include a media gateway (MGW) 2144, a mobile switching center (MSC) 2146, a serving GPRS support node (SGSN) 2148, and/or a gateway GPRS support node (GGSN) 2150. While each of the foregoing elements is depicted as part of the core network 2106a, it should be appreciated that any one of these elements may be owned and/or operated by an entity other than the core network operator.

The RNC 2142a in the RAN 2104a may be connected to the MSC 2146 in the core network 2106a via an IuCS interface. The MSC 2146 may be connected to the MGW 2144. The MSC 2146 and the MGW 2144 may provide the WTRUs 2102a, 2102b, 2102c with access to circuit-switched networks, such as the PSTN 2108, to facilitate communications between the WTRUs 2102a, 2102b, 2102c and traditional land-line communications devices.

The RNC 2142a in the RAN 2104a may also be connected to the SGSN 2148 in the core network 2106a via an IuPS interface. The SGSN 2148 may be connected to the GGSN 2150. The SGSN 2148 and the GGSN 2150 may provide the WTRUs 2102a, 2102b, 2102c with access to packet-switched networks, such as the Internet 2110, to facilitate communications between and the WTRUs 2102a, 2102b, 2102c and IP-enabled devices.

As noted above, the core network 2106a may also be connected to the networks 2112, which may include other wired or wireless networks that are owned and/or operated by other service providers.

Figure 21D:
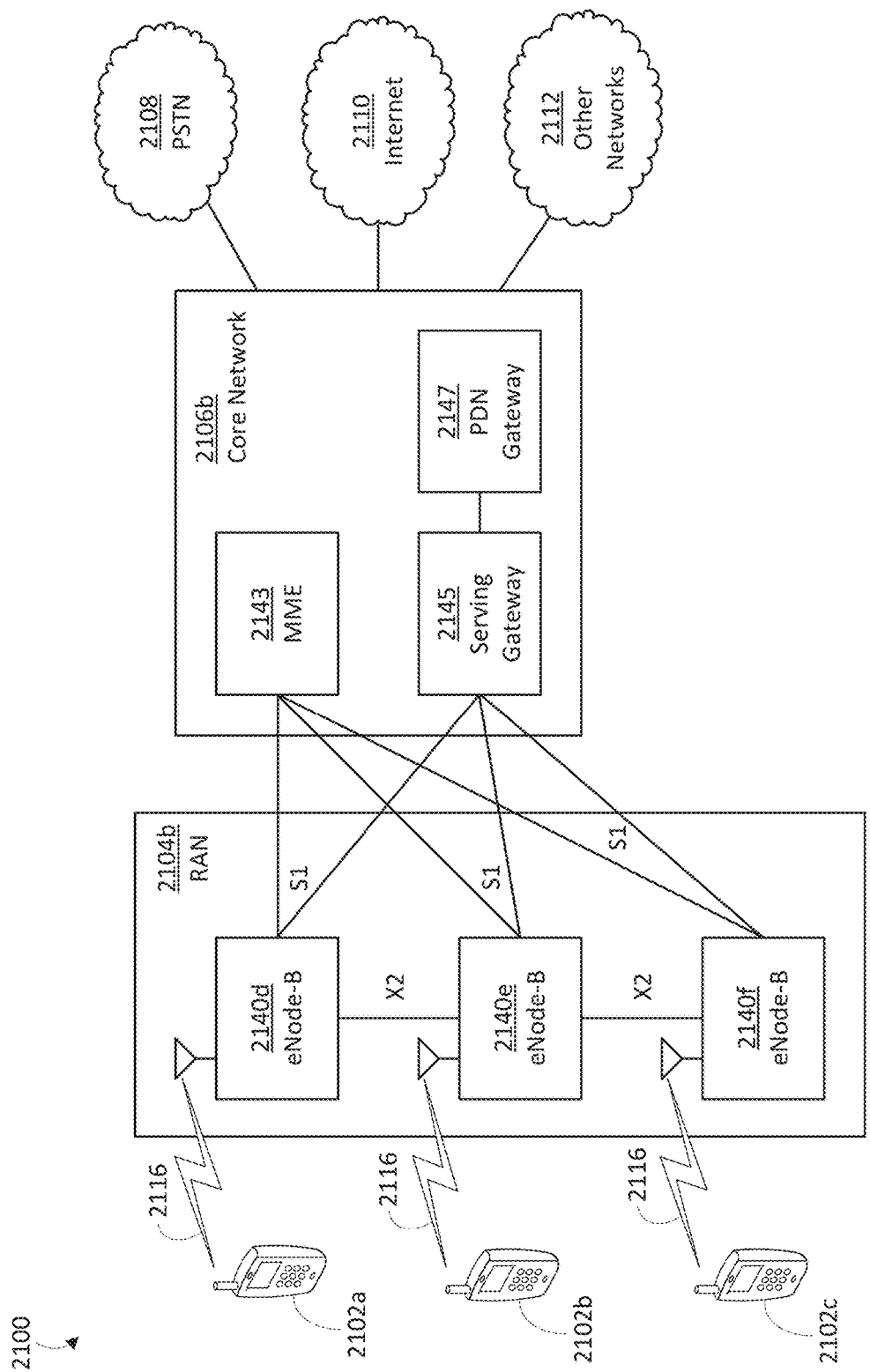
FIG. 21D depicts a system diagram of an example radio access network and an example core network that may be used within the communications system illustrated in FIG. 21A.

FIG. 21D is a system diagram of an embodiment of the communications system 2100 that includes a RAN 2104b and a core network 2106b that comprise example implementations of the RAN 2104 and the core network 2106, respectively. As noted above, the RAN 2104, for instance the RAN 2104b, may employ an E-UTRA radio technology to communicate with the WTRUs 2102a, 2102b, and 2102c over the air interface 2116. The RAN 2104b may also be in communication with the core network 2106b.

The RAN 2104b may include eNode-Bs 2140d, 2140e, 2140f, though it should be appreciated that the RAN 2104b may include any number of eNode-Bs while remaining consistent with an embodiment. The eNode-Bs 2140d, 2140e, 2140f may each include one or more transceivers for communicating with the WTRUs 2102a, 2102b, 2102c over the air interface 2116. In one embodiment, the eNode-Bs 2140d, 2140e, 2140f may implement MIMO technology. Thus, the eNode-B 2140d, for example, may use multiple antennas to transmit wireless signals to, and receive wireless signals from, the WTRU 2102a.

Each of the eNode-Bs 2140d, 2140e, and 2140f may be associated with a particular cell (not shown) and may be configured to handle radio resource management decisions, handover decisions, scheduling of users in the uplink and/or downlink, and the like. As shown in FIG. 21D, the eNode-Bs 2140d, 2140e, 2140f may communicate with one another over an X2 interface.

The core network 2106b shown in FIG. 21D may include a mobility management gateway (MME) 2143, a serving gateway 2145, and a packet data network (PDN) gateway 2147. While each of the foregoing elements is depicted as part of the core network 2106b, it should be appreciated that any one of these elements may be owned and/or operated by an entity other than the core network operator.

The MME 2143 may be connected to each of the eNode-Bs 2140d, 2140e, and 2140f in the RAN 2104b via an S1 interface and may serve as a control node. For example, the MME 2143 may be responsible for authenticating users of the WTRUs 2102a, 2102b, 2102c, bearer activation/deactivation, selecting a particular serving gateway during an initial attach of the WTRUs 2102a, 2102b, 2102c, and the like. The MME 2143 may also provide a control plane function for switching between the RAN 2104b and other RANs (not shown) that employ other radio technologies, such as GSM or WCDMA.

The serving gateway 2145 may be connected to each of the eNode Bs 2140d, 2140e, 2140f in the RAN 2104b via the S1 interface. The serving gateway 2145 may generally route and forward user data packets to/from the WTRUs 2102a, 2102b, 2102c. The serving gateway 2145 may also perform other functions, such as anchoring user planes during inter-eNode B handovers, triggering paging when downlink data is available for the WTRUs 2102a, 2102b, 2102c, managing and storing contexts of the WTRUs 2102a, 2102b, 2102c, and the like.

The serving gateway 2145 may also be connected to the PDN gateway 2147, which may provide the WTRUs 2102a, 2102b, 2102c with access to packet-switched networks, such as the Internet 2110, to facilitate communications between the WTRUs 2102a, 2102b, 2102c and IP-enabled devices.

The core network 2106b may facilitate communications with other networks. For example, the core network 2106b may provide the WTRUs 2102a, 2102b, 2102c with access to circuit-switched networks, such as the PSTN 2108, to facilitate communications between the WTRUs 2102a, 2102b, 2102c and traditional land-line communications devices. For example, the core network 2106b may include, or may communicate with, an IP gateway (e.g., an IP multimedia subsystem (IMS) server) that serves as an interface between the core network 2106b and the PSTN 2108. In addition, the core network 2106b may provide the WTRUs 2102a, 2102b, 2102c with access to the networks 2112, which may include other wired or wireless networks that are owned and/or operated by other service providers.

Figure 21E:
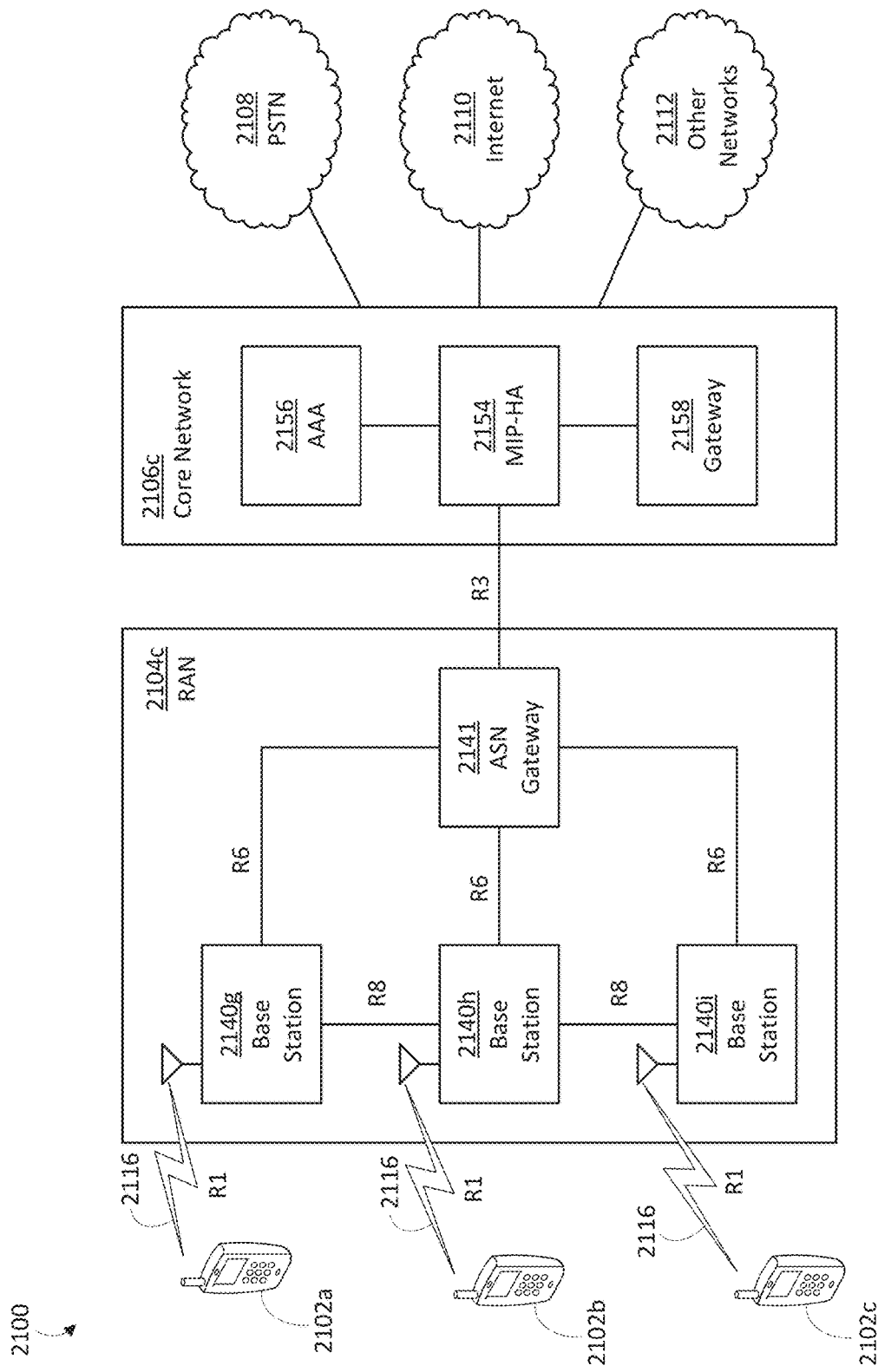
FIG. 21E depicts a system diagram of an example radio access network and an example core network that may be used within the communications system illustrated in FIG. 21A.

FIG. 21E is a system diagram of an embodiment of the communications system 2100 that includes a RAN 2104c and a core network 2106c that comprise example implementations of the RAN 2104 and the core network 2106, respectively. The RAN 2104, for instance the RAN 2104c, may be an access service network (ASN) that employs IEEE 802.16 radio technology to communicate with the WTRUs 2102a, 2102b, and 2102c over the air interface 2116. As described herein, the communication links between the different functional entities of the WTRUs 2102a, 2102b, 2102c, the RAN 2104c, and the core network 2106c may be defined as reference points.

As shown in FIG. 21E, the RAN 2104c may include base stations 2140g, 2140h, 2140i, and an ASN gateway 2141, though it should be appreciated that the RAN 2104c may include any number of base stations and ASN gateways while remaining consistent with an embodiment. The base stations 2140g, 2140h, 2140i may each be associated with a particular cell (not shown) in the RAN 2104c and may each include one or more transceivers for communicating with the WTRUs 2102a, 2102b, 2102c over the air interface 2116. In one embodiment, the base stations 2140g, 2140h, 2140i may implement MIMO technology. Thus, the base station 2140g, for example, may use multiple antennas to transmit wireless signals to, and receive wireless signals from, the WTRU 2102a. The base stations 2140g, 2140h, 2140i may also provide mobility management functions, such as handoff triggering, tunnel establishment, radio resource management, traffic classification, quality of service (QoS) policy enforcement, and the like. The ASN Gateway 2141 may serve as a traffic aggregation point and may be responsible for paging, caching of subscriber profiles, routing to the core network 2106c, and the like.

The air interface 2116 between the WTRUs 2102a, 2102b, 2102c and the RAN 2104c may be defined as an R1 reference point that implements the IEEE 802.16 specification. In addition, each of the WTRUs 2102a, 2102b, and 2102c may establish a logical interface (not shown) with the core network 2106c. The logical interface between the WTRUs 2102a, 2102b, 2102c and the core network 2106c may be defined as an R2 reference point, which may be used for authentication, authorization, IP host configuration management, and/or mobility management.

The communication link between each of the base stations 2140g, 2140h, 2140i may be defined as an R8 reference point that includes protocols for facilitating WTRU handovers and the transfer of data between base stations. The communication link between the base stations 2140g, 2140h, 2140i and the ASN gateway 2141 may be defined as an R6 reference point. The R6 reference point may include protocols for facilitating mobility management based on mobility events associated with each of the WTRUs 2102a, 2102b, 2102c.

As shown in FIG. 21E, the RAN 2104c may be connected to the core network 2106c. The communication link between the RAN 2104c and the core network 2106c may defined as an R3 reference point that includes protocols for facilitating data transfer and mobility management capabilities, for example. The core network 2106c may include a mobile IP home agent (MIP-HA) 2154, an authentication, authorization, accounting (AAA) server 2156, and a gateway 2158. While each of the foregoing elements is depicted as part of the core network 2106c, it should be appreciated that any one of these elements may be owned and/or operated by an entity other than the core network operator.

The MIP-HA may be responsible for IP address management, and may enable the WTRUs 2102a, 2102b, and 2102c to roam between different ASNs and/or different core networks. The MIP-HA 2154 may provide the WTRUs 2102a, 2102b, 2102c with access to packet-switched networks, such as the Internet 2110, to facilitate communications between the WTRUs 2102a, 2102b, 2102c and IP-enabled devices. The AAA server 2156 may be responsible for user authentication and for supporting user services. The gateway 2158 may facilitate interworking with other networks. For example, the gateway 2158 may provide the WTRUs 2102a, 2102b, 2102c with access to circuit-switched networks, such as the PSTN 2108, to facilitate communications between the WTRUs 2102a, 2102b, 2102c and traditional landline communications devices. In addition, the gateway 2158 may provide the WTRUs 2102a, 2102b, 2102c with access to the networks 2112, which may include other wired or wireless networks that are owned and/or operated by other service providers.

Although not shown in FIG. 21E, it should be appreciated that the RAN 2104c may be connected to other ASNs and the core network 2106c may be connected to other core networks. The communication link between the RAN 2104c the other ASNs may be defined as an R4 reference point, which may include protocols for coordinating the mobility of the WTRUs 2102a, 2102b, 2102c between the RAN 2104c and the other ASNs. The communication link between the core network 2106c and the other core networks may be defined as an R5 reference point, which may include protocols for facilitating interworking between home core networks and visited core networks.

Although features and elements are described above in particular combinations, one of ordinary skill in the art will appreciate that each feature or element may be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read-only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, terminal, base station, RNC, or any host computer. Features and/or elements described herein in accordance with one or more example embodiments may be used in combination with features and/or elements described herein in accordance with one or more other example embodiments.

What is claimed:

1. A method of video decoding, the method comprising:
receiving a video signal and a high-pass filter that is optimized for the video signal;
applying the high-pass filter to a luma plane pixel of the video signal to determine a chroma offset; and
adding the chroma offset to a corresponding chroma plane pixel of the video signal.

2. The method of claim 1, further comprising:
receiving an indication of a region of the video signal to which the high-pass filter is to be applied; and
applying the high-pass filter to the region.

3. The method of claim 1, further comprising receiving an indication to apply the high-pass filter to at least one of a sequence level, a picture level, a slice level, or a block level of the video signal.

4. The method of claim 1, wherein applying the high-pass filter is performed in a single-layer video coding process as post-processing.

5. The method of claim 1, wherein applying the high-pass filter is performed in a multi-layer video coding process, the luma plane pixel is an upsampled base layer luma plane pixel, and the chroma plane pixel is an upsampled base layer chroma plane pixel.

6. The method of claim 1, wherein applying the high-pass filter is performed in a multi-layer video coding process, the luma plane pixel is a base layer luma plane pixel that has not been upsampled, and the chroma plane pixel is an upsampled base layer chroma plane pixel.

7. A video coding device comprising:
a network interface that is configured to:
receive a video signal and a high-pass filter that is optimized for the video signal; and
a processor that is configured to:
apply the high-pass filter to a luma plane pixel of the video signal to determine a chroma offset; and
add the chroma offset to a corresponding chroma plane pixel of the video signal.

8. The video coding device of claim 7, wherein the processor is further configured to:
receive, via the network interface, an indication of a region of the video signal to which the high-pass filter is to be applied; and
apply the high-pass filter to the region.

9. The video coding device of claim 7, wherein the processor is further configured to receive, via the network interface, an indication to apply the high-pass filter to at least one of a sequence level, a picture level, a slice level, or a block level of the video signal.

10. The video coding device of claim 7, wherein the processor is configured to apply the high-pass filter in a single-layer video coding process as post-processing.

11. The video coding device of claim 7, wherein the processor is configured to apply the high-pass filter in a multi-layer video coding process, the luma plane pixel is an upsampled base layer luma plane pixel, and the chroma plane pixel is an upsampled base layer chroma plane pixel.

12. The video coding device of claim 7, wherein the processor is configured to apply the high-pass filter in a multi-layer video coding process, the luma plane pixel is a base layer luma plane pixel that has not been upsampled, and the chroma plane pixel is an upsampled base layer chroma plane pixel.

* * * * *